(12) United States Patent
Hishida et al.

(10) Patent No.: US 6,477,549 B1
(45) Date of Patent: Nov. 5, 2002

(54) TRANSMISSION DOCUMENT EDITING DEVICE, A SERVER DEVICE IN A COMMUNICATION DOCUMENT PROCESSING SYSTEM, AND A COMPUTER-READABLE RECORD MEDIUM THAT STORES THE FUNCTION THEREOF

(75) Inventors: Toshihiro Hishida, Kobe (JP); Hidetaka Ohto, Takarazuka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/166,665

(22) Filed: Oct. 5, 1998

(30) Foreign Application Priority Data

Oct. 6, 1997 (JP) .............................. 9-272490
Sep. 22, 1998 (JP) .......................... 10-268762

(51) Int. Cl.$^7$ ............................................. G06F 17/21
(52) U.S. Cl. ..................................... 707/513; 345/172
(58) Field of Search ................................ 707/517, 523, 707/513, 10, 501.1; 709/203, 217, 202, 200, 218, 219, 228; 703/13; 455/413; 379/88.13, 88.14; 345/172

(56) References Cited

U.S. PATENT DOCUMENTS 5,835,712 A * 11/1998 DuFresne ..................... 707/10
5,862,321 A * 1/1999 Lamming et al. ........... 358/403
5,983,227 A * 11/1999 Nazem et al. .................. 705/1
6,023,714 A * 2/2000 Hill et al. .................... 345/760
6,161,114 A * 12/2000 King et al. ............... 707/500.1
6,226,642 B1 * 5/2001 Beranek et al. ................ 707/10

OTHER PUBLICATIONS

Spyglass Prism 1.0. Spyglass. pp. 1–2. 1997.*
Spyglass Prism: Concepts and Applications. pp. 1–8. 1997.*
"Spyglass' Prism Displays Web Content On Non–PC Devices" by B. Woods, NEWSBYTES, Online!, Sep. 16, 1997.*
"U.S. Robotics Exhibits Spyglass Prism Dynamic Content Conversion Solution at CelluCommEXPO '97", http://www.spyglass.com/newsflash/releases/97/052097usr.html, May 20, 1997.*
"Digestor: device–independent access to the World Wide Web," by T. Bickmore et al., Computer Networks and ISDN Systems, vol. 29, No. 8–13, Sep. 1997, pp. 1075–1082.*
"Spyglass' Prism Displays Web Content on Non–PC Devices," by B. Woods, NEWSBYTES, Online!, Sep. 16, 1997.
"Converting PC GUIs for NonPC Devices," by D. Johnson, Circuit Cellar Ink, Feb. 1998.
"Digestor: device–independent access to the World Wide Web," by T. Bickmore et al., Computer Networks and ISDN Systems, vol. 29, No. 8–13, Sep. 1997.
"Spyglass Prism Allows Non–PC Devices to Display Content up to Four Times Faster," TECHMALL, Online!, Sep. 16, 1997.
"Multi–Environment Preprocessor for Documentation Publishing System,", IBM Technical Disclosure Bulletin, vol. 37, No. 4b, Apr. 1994.
"Reducing latency and bandwidth requirements by real–time distillation," by A. Fox et al., Computer Networks and ISDN Systems, vol. 28, 1996.

* cited by examiner

Primary Examiner—Joseph H. Feild
(74) Attorney, Agent, or Firm—Price and Gess

(57) ABSTRACT

A transmission document edition device edits a transmission document to be transmitted to a variety of mobile communication terminals from a document described in a markup language. A document content storage unit stores a document including a plurality of document elements to be transmitted. A device input/output information storage unit stores a plurality of pieces of device input/output information that indicate the document elements to be transmitted for a plurality of types of mobile communication terminal. A transmission document creation unit creates a transmission document including the document and the plurality of pieces of device input/output information.

14 Claims, 19 Drawing Sheets

FIG. 3

```
<HTML>
<BODY STYLE="font:normal">
<H1 onclick="func1()">Mr.X Got Married ! ! </H1>
<H2>Wedding at Y Church October,1997. </H2>
<H3>The bride is Ms.Z. There has been a rumor that they'er going to get married. They got acquainted with each other........</H3>
<H1>Mr.A Died ! </H1>
<H2>He died at B Hospital October,1997. </H2>
<H3>He died of heart failure.Mr.A has suffered from heart disease......... </H3>
<SCRIPT langage="JavaScript">
function func1(){
    document.body.style.font="italic";
}
</SCRIPT>
</BODY>
</HTML>
```

FIG. 4

DEVICE INPUT/OUTPUT INFORMATION TABLE 401

| DEVICE | OUTPUT INFORMATION | INPUT INFORMATION |
|---|---|---|
| Pager | display : monochrome<br>displaywidth : 80pt<br>displayheight : 40pt<br>digest : tag(H1)<br>scroll : on(card) | onfocus : ButtonPress(Select)<br>onclick : ButtonPress(Set) |

DEVICE INPUT/OUTPUT INFORMATION TABLE 401

| DEVICE | OUTPUT INFORMATION | INPUT INFORMATION |
|---|---|---|
| Pager | display : monochrome<br>displaywidth : 80pt<br>displayheight : 40pt<br>digest : tag(H1)<br>scroll : on(card) | onfocus : ButtonPress(Select)<br>onclick : ButtonPress(Set) |
| Phone | display : monochrome<br>displaywidth : 320pt<br>displayheight : 200pt<br>digest : tag(H1,H2)<br>scroll : on(normal) | onfocus : ButtonPress(↑,↓)<br>onclick : ButtonPress(Hold) |
| ---- | ---- | ---- |

BUTTON CORRESPONDENCE TABLE 801

| BUTTON USED IN SIMULATION (802) | BUTTON ON RECEIVED DOCUMENT PROCESSING DEVICE (803) |
|---|---|
| F1 BUTTON | SELECT BUTTON |
| F2 BUTTON | SET BUTTON |
| F3 BUTTON | ↑ BUTTON |
| F4 BUTTON | ↓ BUTTON |
| F5 BUTTON | HOLD BUTTON |
| F6 BUTTON | POWER OFF BUTTON |
| ⋮ | ⋮ |

FIG. 20

RECEIVER LIST 2001

| RECEIVER IDENTIFIER | DEVICE TYPE |
|---|---|
| Aa | PHONE |
| Ab | PHONE |
| Ac | PHONE |
| Ca | PAGER |
| Cb | PAGER |
| Cc | PAGER |
| Ba | PERSONAL COMPUTER |
| Bb | PERSONAL COMPUTER |
| Bc | PERSONAL COMPUTER |
| ... | ... |

TRANSMISSION DOCUMENT EDITING DEVICE, A SERVER DEVICE IN A COMMUNICATION DOCUMENT PROCESSING SYSTEM, AND A COMPUTER-READABLE RECORD MEDIUM THAT STORES THE FUNCTION THEREOF

This application is based on application Nos. 9-272490 and 10-268762 filed in Japan, the contents of which are hereby incorporated by reference.

BACKGROUND OF THE INVENTION

1. Field of the Invention

The present invention relates to a transmission document edition device that edits transmission documents described in markup languages, a received document processing device that receives and processes the transmission documents, and a communication document processing system that includes the transmission document edition device and the received document processing device.

2. Description of the Conventional Art

As a markup language, the SGML (Standard Generalized Markup Language) that is standardized by the ISO (International Organization for Standardization) has been used. The SGML is designed for document interchanges and is expressed as a group of elements called tags to describe the contents and the structure of a document. In the SGML, the contents of a document is precisely described. As a result, it is possible and easy to analyze such a document using a computer.

With the development of the Internet, the documents in the HTML (Hypertext Markup Language) that is based on the SGML have been interchanged. Such a document described in the HTML, i.e., an HTML document, is displayed using a Web browser that is a software for processing documents in the HTML. The HTML is standardized by the W3C (World Wide Web Consortium). The HTML Ver.3.2 has been standardized, and now standardization of the HTML Ver.4.0, which is the HTML for the next generation, is now being discussed. (The HTML is disclosed in detail on the home page with the URL (Uniform Resource Locator) "http://www.w3c.org/".) The HTML Ver.4.0 enables the processing corresponding to an input operation using the Web browser to be described in the program called "script". As a result, a wider variety of expression may be realized using the HTML Ver.4.0. For instance, it is possible to change the color of certain part of a document with the click of a mouse.

Conventionally, such an HTML document, which is transmitted via the Internet, was only received and displayed by personal computers, workstations, or the like. Recently, mobile communication terminals such as a portable remote terminal installed with a Web browser have begun to process such an HTML document.

Mobile communication terminals, however, have smaller display screens than personal computers, and the display areas are limited compared with those of personal computers. As a result, when displaying an HTML document that is originally created for personal computers or workstations, mobile communication terminals cannot display the HTML document as it is intended to be displayed. In order to solve the problem, it is necessary to create different HTML documents for different types of communication terminals.

As described above, it is possible to describe the processing corresponding to an input operation using the Web browser in an HTML document. Such an HTML document can include information on input units that mobile communication terminals are not equipped with. In this case, the operations using the input units may not be realized by mobile communication terminals. For instance, an operation input with a mouse may not be realized by pagers, which are equipped with no mouse.

SUMMARY OF THE INVENTION

It is accordingly an object of the present invention to provide a transmission document edition device that edits a transmission document from a general purpose document that is described in a markup language and a plurality of pieces of device information each piece of which includes information on the processing of the general purpose document for one specification of mobile communication terminal.

Another object of the present invention is to provide a transmission document edition device that simulates the display of a transmission document by a plurality of specifications of mobile communication terminal and the processing corresponding to a user input operation.

A further object of the present invention is to provide a received document processing device that enables a mobile communication terminal that receives a transmission document edited by the transmission document edition device to display the received transmission document in the most suitable manner and to perform processing corresponding to a user input operation.

Yet another object of the present invention is to provide a communication document processing system that changes a transmission document edited by the transmission document edition device into another transmission document for a specification of mobile communication terminal in order to reduce the load of the specification of mobile communication terminal and transmits the changed transmission document to the specification of mobile communication terminal.

The above-mentioned first object is achieved by a transmission document edition device that edits a transmission document to be transmitted to receiver devices of a plurality of specifications from a general purpose document described in a markup language, that may include: a document storage unit for storing the general purpose document described in the markup language; a device specification information storage unit for storing a plurality of pieces of device specification information, each piece of which a receiver device of a different specification refers to when processing the general purpose document according to marks in the markup language; and a transmission document creation unit for reading the general purpose document stored in the document storage unit and the plurality of pieces of device specification information stored in the device specification information storage unit and for creating the transmission document in which the general purpose document and the plurality of pieces of device specification information are related to each other.

It is possible for the transmission document edition device to create one transmission document that mobile communication terminals of the plurality of specifications may process. As a result, it is unnecessary to create a different transmission document for each specification of mobile communication terminal.

The first object may be achieved by the transmission document edition device, wherein a piece of device specification information includes information defining input and/or information defining output for a specification of receiver device, wherein information defining input includes each operation of a receiver device of a specification and a processing of the general purpose document accompanying an operation for each operation, and information defining output includes processing conditions for displaying the general purpose document in a manner suitable for the specification of receiver device, and the transmission document creation unit reads information defining input and/or information defining output for each of the plurality of specifications of receiver device from the device specification information storage unit, and has the read information defining input and/or the read information defining output be included in the transmission document in a manner in which information defining input and/or information defining output for a specification of receiver device is distinguishable.

It is possible for the transmission document edition device to create one transmission document that includes a plurality of pieces of device specification information for the plurality of specifications of mobile communication terminal. As a result, a mobile communication terminal may perform the same processing as processing the general purpose document in a transmission document created only for the specification of the mobile communication terminal. In addition, a mobile communication terminal may process the general purpose document using the operation key on the mobile communication terminal.

The first object may also be achieved by the transmission document edition device, wherein the transmission document creation unit describes an identifier showing a specification of receiver device using a first tag, information defining output using a second tag, and information defining input using a third tag, wherein each of the first tag, the second tag, and the third tag corresponds to a mark in the markup language.

The first object may also be achieved by the transmission document edition device that may include transmission unit for transmitting the transmission document that the transmission document creation unit has created to the receiver devices of the plurality of specifications.

As a result, a mobile communication terminal that receives a transmission document may distinguish the necessary piece of device specification information using tags and extract the distinguished device specification information.

The above-mentioned second object is achieved by the transmission document edition device that may include: a transmission document storage unit for storing the transmission document that the transmission document creation unit has created; an acceptance unit for accepting a designation of a specification of receiver device for which a simulation is run from an operator; and a simulation execution unit for reading a piece of device specification information for the accepted specification of receiver device and the general purpose document from the transmission document stored in the transmission document storage unit, for creating a simulation document from the read general purpose document according to the read piece of device specification information, and for displaying the created simulation document.

It is possible for the transmission document edition device to check a display document displayed by a mobile communication terminal as a simulation document. As a result, a transmission document may be created efficiently.

The second object may be achieved by the transmission document edition device, wherein the general purpose document includes a plurality of document elements, the read piece of device specification information includes processing conditions for displaying the general purpose document in a manner suitable for the accepted specification of receiver device, and the simulation execution unit includes a simulation document creation unit for selecting each document element designated by the processing conditions from the general purpose document and for creating the simulation document from the selected document element.

As a result, each document element in a simulation document may be checked.

The second object may also be achieved by the transmission document edition device, wherein the processing conditions include display screen size information, document element selection information, and scroll information for the accepted specification of receiver device, and the simulation document creation unit includes: a general purpose document reading unit for reading the general purpose document from the transmission document stored in the transmission document storage unit; a document element selection unit for selecting each document element designated by the document element selection information; and a document element arrangement unit for arranging the selected document element on a virtual screen.

The second object may also be achieved by the transmission document edition device, wherein the simulation document creation unit further includes a simulation document display unit for having a display screen, for creating a frame on the display screen according to the display screen size information, for cutting part of the virtual screen on which the document element arrangement unit has arranged the selected document element according to the display screen size information and the scroll information, and for displaying the part of the virtual screen within the frame.

As a result, a simulation document may be displayed on the same display screen as in a receiver mobile communication terminal.

The second object may also be achieved by the transmission document edition device that may include: a simulation information storage unit for storing simulation information in which first operation keys on the receiver devices of the plurality of specifications correspond to second operation keys on the transmission document edition device, wherein the general purpose document includes a user operation and a content of a processing accompanying the user operation, the piece of device specification information includes information that describes an operation of a first operation key corresponding to the user operation, the acceptance unit includes an operation key acceptance unit for accepting an operation of a second operation key from the operator, the simulation execution unit includes: an operation key conversion unit for converting the accepted second operation key operation into a corresponding operation of a first operation key; and a simulation document changing unit for changing the displayed simulation document according to a content of a processing that corresponds to a user operation corresponding to the first operation key operation and for displaying the changed simulation document.

As a result, the operation that is performed when an operation key on a mobile communication terminal (a first operation key) is operated may be performed using an operation key on the transmission document edition device (a second operation key), and a displayed simulation document may be changed according to the operation of second operation keys.

The second object may also be achieved by the transmission document edition device, wherein the processing is written in a program that is described in a virtual machine language, and the simulation document changing unit changes the displayed simulation document according to the program.

As a result, a program may be executed using the HTML browser.

The second object may also be achieved by the transmission document edition device, wherein the document element selection unit selects each document element to which a tag identified in the document element selection information is attached.

As a result, each document element to be displayed may be easily selected.

The above-mentioned third object is achieved by a received document processing device that receives a received document in which a general purpose document that is described in a markup language and a plurality of pieces of device specification information, each piece of which a received document processing device of a different specification refers to when processing the general purpose document according to marks in the markup language, are related to each other, the received document processing device that may include: a received document storage unit for storing the received document that the received document processing device has received; a received document reading unit for reading the received document that the received document storage unit stores; a first identification unit for identifying the plurality of pieces of device specification information and the general purpose document in the read received document; a second identification unit for identifying a piece of device specification information for the received document processing device in the plurality of pieces of device specification information; a display screen; and a display control unit for processing, when receiving the received document, the general purpose document that the first identification unit has identified on referring to the piece of device specification information that the second identification unit has identified, for creating a display document, and for displaying the created display document on the display screen.

Such a received document processing device that receives a received document transmitted to received document processing devices of the plurality of specifications may display a document suitable for the received document processing device and change the displayed document.

The third object may be achieved by the received document processing device according to claim 12, wherein the identified piece of device specification information includes information defining input and/or information defining output for the received document processing device, wherein the information defining input includes each operation of the received document processing device and a processing of the general purpose document accompanying an operation for each operation, and the information defining output includes processing conditions for displaying the general purpose document in a manner suitable for the received document processing device, and the general purpose document includes a plurality of document elements, and the display control unit includes: a first display control unit for selecting each document element designated by the processing conditions from the general purpose document and for creating the display document from the selected document element; and/or a second display control unit for changing the created display document according to a processing that corresponds to an operation key on the received document processing device and is described in the general purpose document.

As a result, such a received document processing device may receive a received document, display a display document, and change the display document according to the user operations.

The third object may also be achieved by the received document processing device, wherein the processing conditions include display screen size information, document element selection information, and scroll information for the received document processing device, the first display control unit includes: a document element selection unit for selecting each document element designated by the document element selection information; and a document element arrangement unit for arranging the selected document element on the display screen according to the display screen size information and the scroll information.

As a result, a display document suitable for such a received document processing device may be easily displayed and changed.

The third object may also be achieved by the received document processing device, wherein the document element selection unit selects each document element to which a tag identified in the document element selection information is attached, wherein each tag is a mark in the markup language.

As a result, the document element may be selected more easily.

The third object may also be achieved by the received document processing device that is one of a pager and a mobile phone.

As a result, pagers or mobile phones may receive the same received document as personal computers receive and may display a document suitable for pagers or mobile phones.

The third object may also be achieved by the received document processing device, wherein a processing is written in a program that is described in a virtual machine language, and the second display control unit changes the display document according to the program.

As a result, a program may be easily executed using the HTML browser.

The above-mentioned fourth object is achieved by the information providing server device that may include a document element selection unit for selecting each document element that is necessary for the specification of received document processing device from the transmission document, wherein the general purpose document includes a plurality of document elements, and the piece of device specification information corresponding to the specification of received document processing device includes document element selection information on each document element necessary for the specification of received document processing device.

Such an information providing server device may convert a transmission document that the transmission document edition device has edited into another transmission document suitable for a mobile communication terminal of one specification. As a result, the load of the specification of mobile communication terminal may be reduced.

The present invention may be realized by a computer-readable storage medium for storing a program that realizes a function of editing a transmission document that is to be transmitted to received document processing devices of a plurality of specifications from a general purpose document described in a markup language, wherein the program realizes: a device specification information obtaining unit for obtaining a plurality of pieces of device specification information each piece of which a received document processing device of a different specification refers to when processing the general purpose document according to marks in the markup language; and a transmission document creation unit for creating the transmission document in which the general purpose document that is described in the markup language and the plurality of pieces of device specification information that the device information obtaining unit has obtained are related to each other.

As a result, a transmission document edition device that edits a transmission document to be transmitted to the received document processing devices of the plurality of specifications from a general purpose document described in a markup language and a plurality of pieces of device specification information for the plurality of specifications of mobile communication terminal may be realized.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 3 shows an HTML document that is stored in the document content temporary storage unit in the transmission document edition device according to the first embodiment;

FIG. 4 shows a device input/output information table stored in the device input/output information storage unit in the transmission document edition device according to the first embodiment;

FIG. 5 shows the device input/output information table in FIG. 4 to which information is added;

FIG. 20 shows a receiver list stored in the receiver list storage unit in the relay server device in the communication document processing system according to the third embodiment of the present invention;

DESCRIPTION OF THE PREFERRED EMBODIMENTS

A communication document processing system, and a transmission document edition device, and a received document processing device which each are used in the communication document processing system will be described based on the embodiments below.

First Embodiment

Figure 1:
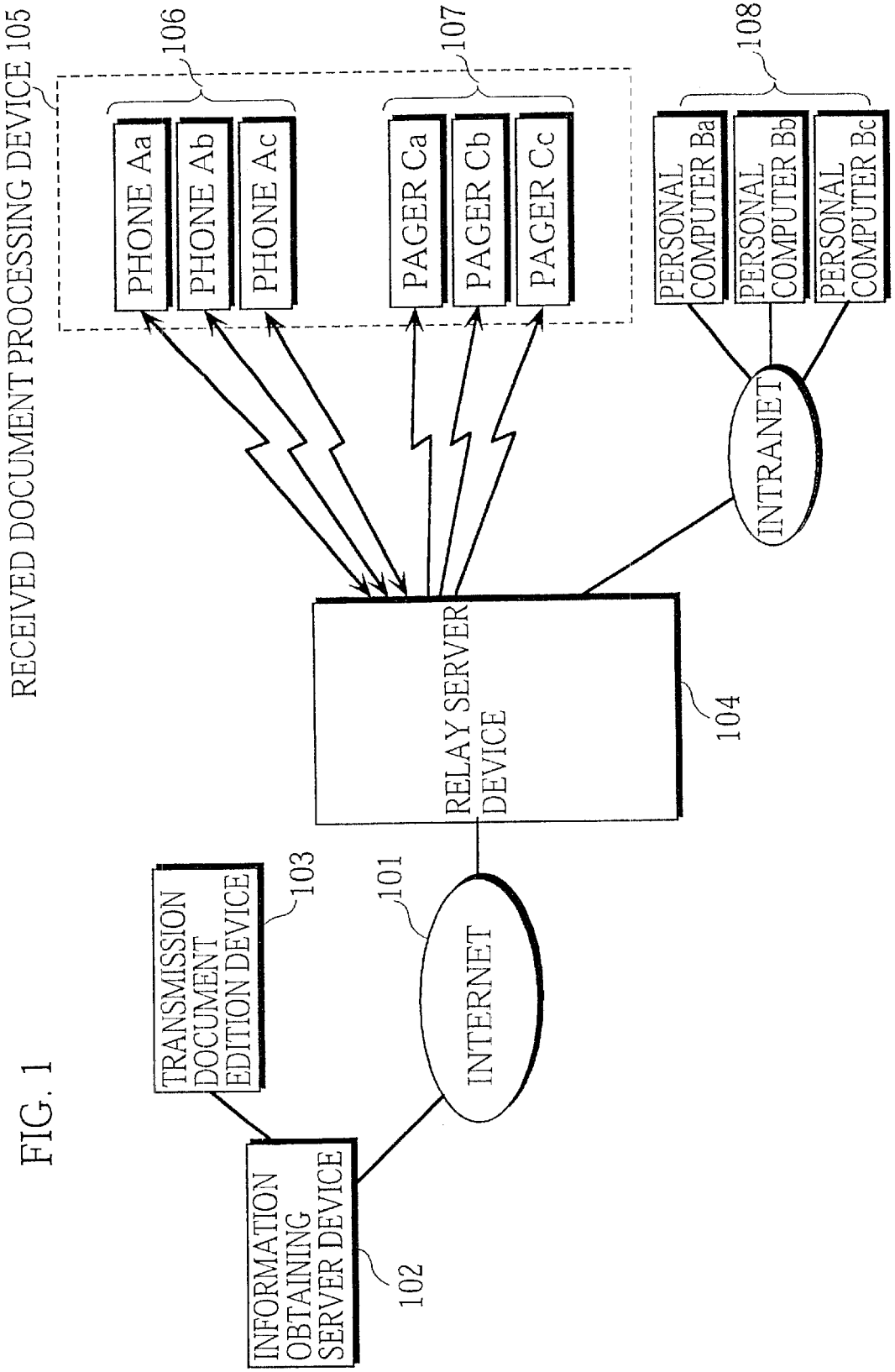
FIG. 1 shows a construction of a transmission document processing system that includes a transmission document edition device and received document processing devices according to the present invention.

FIG. 1 shows a construction of a transmission document processing system according to the present invention. The communication document processing system includes an information providing server device 102 on the Internet 101 that is a public network, a transmission document edition device 103 for supplying transmission documents to the information providing server device 102, a relay server device 104 that is connected to public networks, and received document processing devices 105. A received document processing device 105 is realized by a mobile communication terminal, such as a mobile phone (hereinafter, called a "phone") 106 or a pager 107.

The relay server device 104 is connected to personal computers 108 via an intranet 105.

The transmission document edition device 103 will be explained below.

Figure 2:
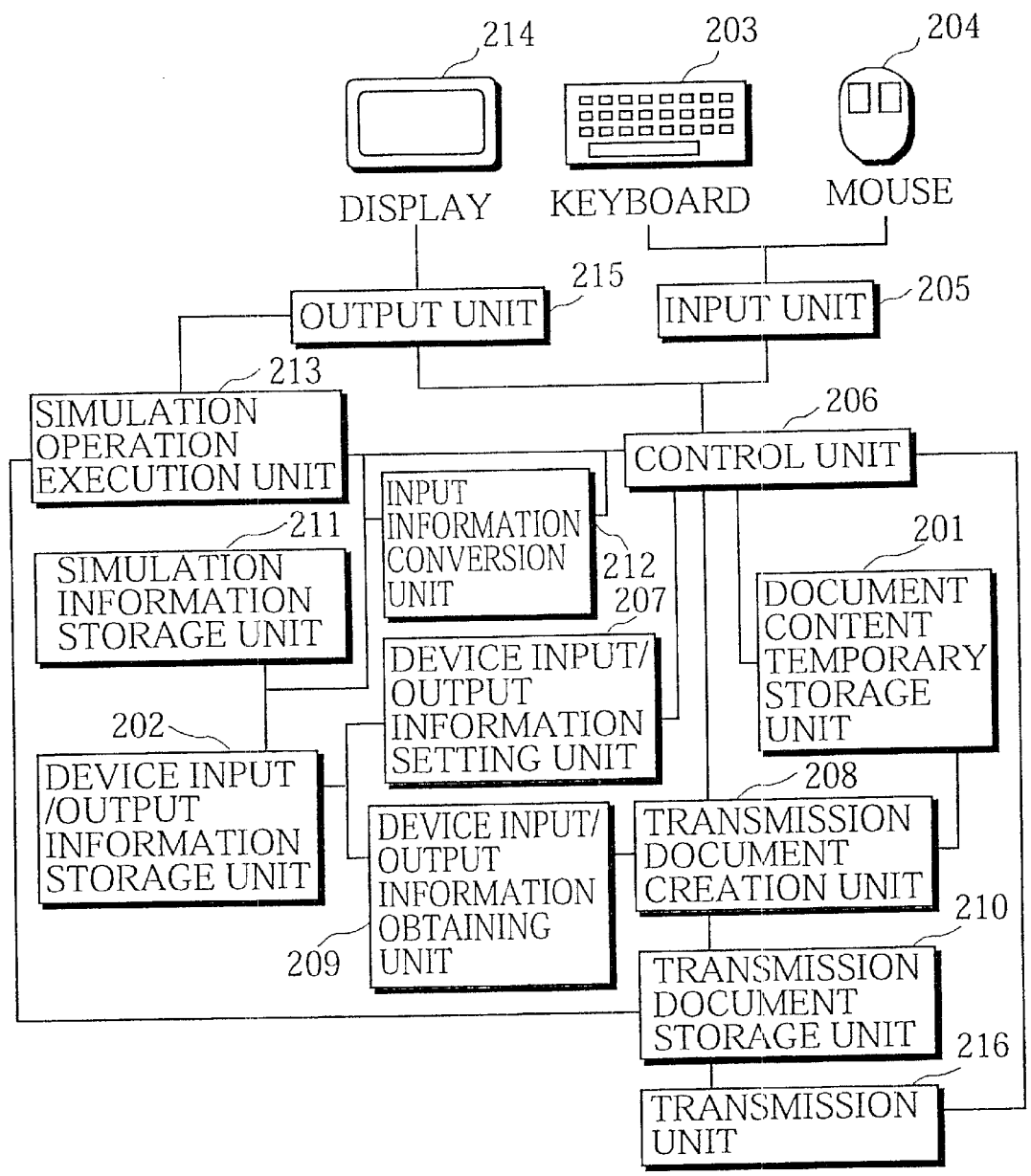
FIG. 2 shows a construction of a transmission document edition device according to the first embodiment of the present invention.

FIG. 2 shows a construction of the transmission document edition device 103 according to the first embodiment.

The transmission document edition device 103 includes a document content temporary storage unit 201, a device input/output information storage unit 202, an input unit 205 that further includes a keyboard 203 and a mouse 204, a control unit 206 for controlling the other elements, a device input/output information setting unit 207, a transmission document creation unit 208, a device input/output information obtaining unit 209, a transmission document storage unit 210, a simulation information storage unit 211, an input information conversion unit 212, a simulation operation execution unit 213, an output unit 215 that further includes a display 214, and a transmission unit 216.

The document content temporary storage unit 201 is composed of a RAM or another storage device, and temporarily stores a document to be edited.

FIG. 3 shows a document 301 stored in the document content temporary storage unit 201.

The document 301 is described in the HTML. A tag 302 <HTML> represents the beginning of a document described in the HTML (an HTML document). A tag 303 </HTML> represents the end of an HTML document. Between the tag 302 <HTML> and the tag 303 </HTML>, the document elements included in an HTML document and other tags are described.

A tag 304 <BODYSTYLE="font:normal"> represents the beginning of the content of an HTML document, and shows that a normal font is used in the HTML document.

A line 305 <H1onclick=func1( )>MR. X got married!!</H1> shows that the character string "Mr. X got married!!" is displayed as a heading, and a function "func 1" is activated when the display area is clicked.

Tags 306 <H1>, 307 <H2>, and 308 <H3> in the document 301 are defined by the HTML and shows that the character strings after the tags 306 <H1> to 308 <H3> are displayed as headings. The sizes of the fonts used in the headings decrease in order of tags 306 <H1>, 307 <H2>, and 308 <H3>.

A tag. 309 <SCRIPTlanguage="JavaScript"> represents the beginning of the description of a function, and shows that the language "JavaScript" is used.

The document 301 is input from the input unit 205 by an operator using the keyboard 203 and the mouse 204, and stored in the document content temporary storage unit 201 via the control unit 206.

Device input/output information storage unit 202 stores input and output information on each kind of the received document processing devices 105, for instance, the input and output information on the phones 106 and the pagers 107.

FIG. 4 shows a device input/output information table 401 stored in the device input/output information storage unit 202. In the device input/output information table 401, a device column 402, an output information column 403, and an input information column 404 are included, and the information on each type of device is described.

The device input/output information table 401 in FIG. 4 shows information 405 on the pagers 107. The output information column 403 shows the image display information on the pagers 107 as follows. The display is a "monochome display", the width of the display is "80 points", the height of the display is "40 points", "the heading after a tag <H1> is extracted" as the "digest output", and data is scrolled "on the basis of a card" on the screen, i.e., display screens are switched.

The information in the input information column 404 shows that when a "select button" on a pager 107 is pressed, an "onfocus event" is occurred and when a "set button" on the pager 107 is pressed, an "onclick event" is occurred.

The device input/output information table 401 is input from the input unit 205 by the operator using the keyboard 203 and the mouse 204, and is set by the device input/output information setting unit 207 via the control unit 206.

When the device input/output information storage unit 202 stores the device input/output information 405 on the pagers 107, and when a transmission document that is to be transmitted to pagers 107 is to be transmitted to the phones 106, which are also received document processing devices 105, device input/output information 501 on the phones 106 is set as shown in FIG. 5.

The output information column 403 shows the image display information on the pagers 106 as follows. The display is a "monochrome display", the width of the display is "320 points", the height of the display is "200 points", "the heading after a tag <H2> is extracted" as the "digest output", and data is scrolled "normally" on the screen. The information in the input information column 404 shows that when an "↑ button" or a "↓ button" on a phone 106 is pressed, an "onfocus event" is occurred and when a "hold button" on a phone 106 is pressed, an "onclick event" is occurred.

When the transmission document is to be transmitted to another type of received document processing device 105, device input/output information on the type of received document processing device 105 is set in the device input/output information table 401.

The "digest output" means that part of the document elements included in the document 301 is output on the screen. This is because the display screens of the pagers 107 and the phones 106 are too small to display the document 301 that is originally described for the personal computers 108 and workstations as a whole.

On receiving an instruction by the operator to create a transmission document from the input unit 205 via the control unit 206, the transmission document creation unit 208 instructs the device input/output information obtaining unit 209 to inform the transmission document creation unit 208 of device input/output information. With the transmission document creation instruction, the transmission document creation unit 208 receives the identifier of the transmission document.

Figure 6:
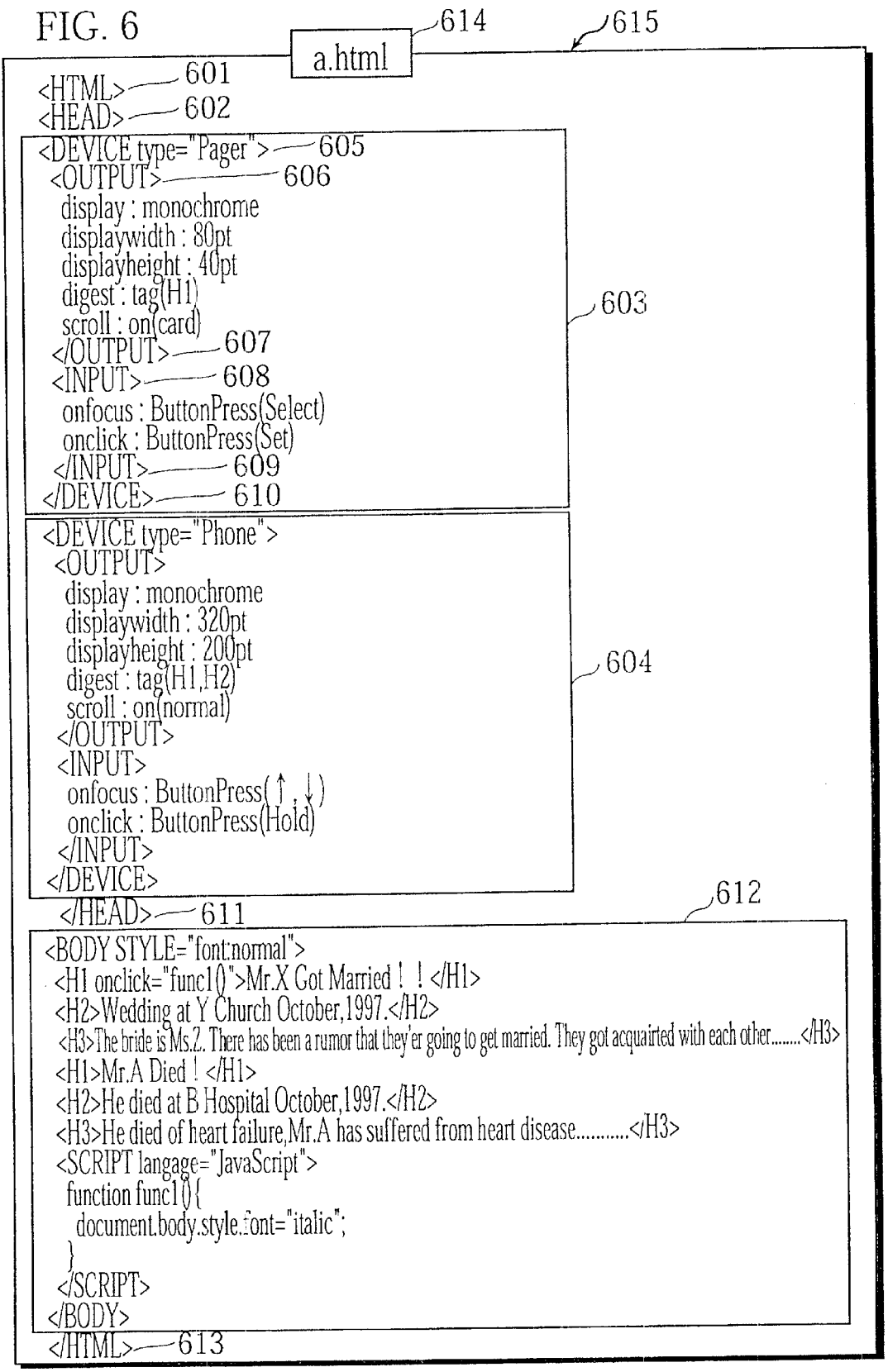
FIG. 6 shows a transmission document that is created in the document creation unit and stored in the document storage unit in the transmission document edition device according to the first embodiment of the present invention.

FIG. 6 shows the transmission document that is created when the document content temporary storage unit 201 stores the document 301 shown in FIG. 3 and device input/output information storage unit 202 stores the device input/output information table 401 shown in FIG. 5.

When receiving the transmission document creation instruction, the transmission document creation unit 208 writes a tag 601 <HTML> that represents the beginning of an HTML document and a tag 602 <HEAD> that represents the beginning of attached information such as a "Style Sheet" (hereinafter, called an "SS") as shown in FIG. 6.

Then, the transmission document creation unit 208 writes SSs 603 and 604 for the devices described in the device input/output information table 401 that has been received from the input/output information obtaining unit 209.

When notified of the type of device "Pager" in the device column 402 of the input/output information table 401, the transmission document creation unit 208 writes "Pager" between the quotation marks in a tag 605 <DEVICEtype= ">". Then, a tag 606 <OUTPUT> is written. When notified of the items in the output information column 403, the transmission document creation unit 208 writes the items. Then, a tag 607 </OUTPUT> that represents the end of output information is written.

After writing a tag 608 <INPUT>, the transmission document creation unit 208 is notified of and writes the items in the input information column 403. After writing a tag 609 </INPUT>, the transmission document creation unit 208 writes a tag 610 </DEVICE> that represents the end of the information on a device.

The SS 604 is written for a device type "Phone" in the same manner. When writing the device input/output information for all the types of the received document processing devices 105, the transmission document creation unit 208 writes a tag 611 </HEAD>.

Then, the transmission document creation unit 208 reads the document 301 that the document content temporary storage unit 201 stores, and writes a document body 612. At the end of the transmission document, the transmission document creation unit 208 writes a tag 613 </HTML> that represents the end of an HTML document. An identifier 614 "a.html" that the transmission document creation unit 208 has been notified of as the identifier of the transmission document 615 is written as the name of the file. The transmission document 615 is stored in the transmission document storage unit 210.

Figures 7, 8:
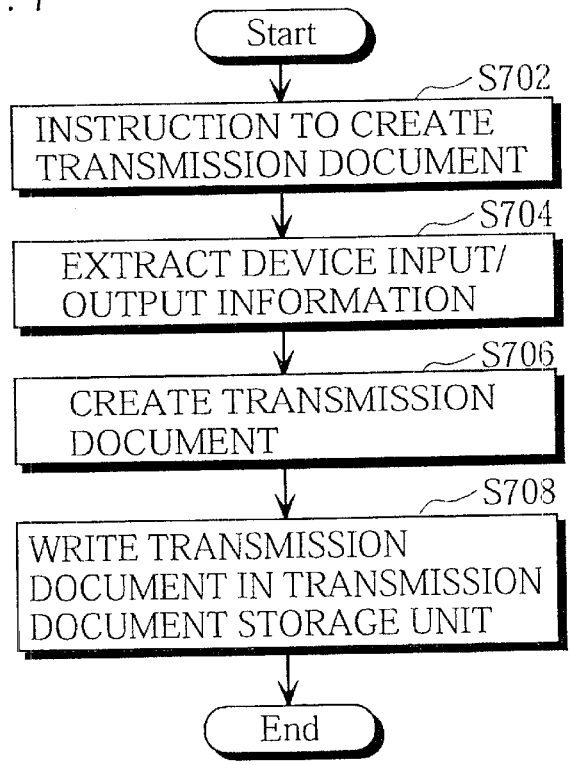
FIG. 7 is a flowchart illustrating the processing of creating a transmission document by the transmission document edition device according to the first embodiment of the present invention.
FIG. 8 shows a piece of simulation information stored in the simulation information storage unit in the transmission document edition device according to the first embodiment of the present invention.

The operations by the transmission document creation unit 208 will be explained with reference to the flowchart in FIG. 7. When receiving the instruction to create a transmission document from the operator via the control unit 206 (Step S702), the transmission document creation unit 208 instructs the device input/output information obtaining unit 209 to obtain the device input/output information for all the types of the received document processing devices 105. When receiving the device input/output information (Step S704), the transmission document creation unit 208 creates the SSs 603 and 604 of the transmission document. Then, the transmission document creation unit 208 reads the document 301 that the document content temporary storage unit 201 stores, writes the document body 612 and the identifier, and completes the creation of transmission document 615 (Step S706). The transmission document creation unit 208 writes the transmission document 615 in the transmission document storage unit 210 (Step S708). The process finishes.

When instructed by the transmission document creation unit 208 to obtain the device input/output information, the device input/output information obtaining unit 209 reads the items in the output information column 403 and the input information column 404 in the device input/output information table 401 for each of the device types in the device column 402 in order, and informs the transmission document creation unit 208 of the read device input/output information.

Transmission document storage unit 210 is composed of a RAM or another storage device, and stores the transmission document 615 that the transmission document creation unit 208 has created.

The simulation information storage unit 211 stores a button correspondence table 801 in which the buttons on the transmission document edition device 103 correspond to the buttons on the received document processing devices 105. The button correspondence table 801 is referred to when the transmission document edition device 103 simulates the display of the transmission document 615 by a received document processing device 105 that receives the transmission document 615 and a display change corresponding to the user operation of a button on a received document processing device 105.

The button correspondence table 801 will be explained with reference to FIG. 8. In the button correspondence table 801, a button column 802 includes the buttons on the keyboard 203, and a button column 803 includes the buttons on the received document processing devices 105. The buttons on the button column 802 and the button column 803 correspond to each other. For instance, the "F1 button" on the keyboard 203 corresponds to the "select button" on the pagers 107, and the "F2 button" on the keyboard 203 corresponds to the "set button" on the pagers 107. The "F2 button", the "F3 button", and the "F6 button" on the keyboard 203 correspond to the "set button" on the pagers 107, the "↑ button" on the phones 106, and the "power off button" on the phones 106 and the pagers 107, respectively.

When receiving a signal that the operator presses a button on the keyboard 203 from the keyboard 203 via the control unit 206, the input information conversion unit 212 converts the signal into the signal that the button in the button column 803 corresponding to the pressed button is pressed, and informs the simulation operation execution unit 213 of the converted signal. For instance, when receiving a signal that the operator presses the "F1 button", the input information conversion unit 212 informs the simulation operation execution unit 213 of a signal that the "select button" on a pager 107 is pressed.

The simulation operation execution unit 213 is installed with an HTML browser, and simulates the display of a transmission document that a received document processing device 105 that has been designated by the operator displays when receiving the document, and a display change corresponding to the user operation of a button on the received document processing device 105.

When receiving the type of the device for which a simulation is run (for instance, the pager or the phone) and the identifier of a transmission document from the input unit 205 via the control unit 206, the simulation operation execution unit 213 obtains the transmission document identified by the received identifier from the transmission document storage unit 210, and creates display data. In this case, the identifier is "a.html", and the received document processing device 105 is a pager 107.

The processing for creating display data will be explained with reference to the flowcharts in FIGS. 9 to 12.

The simulation operation execution unit 213 reads the transmission document 615 (Step S902), and extracts the tags from the transmission document 615 (Step S904). The simulation operation execution unit 213 judges whether the first tag is at the end of the transmission document, i.e., the first tag is a </HTML> tag (Step S906). When the first tag is not a </HTML> tag, the simulation operation execution unit 213 judges whether the first tag is a <DEVICE> tag (Step S908). When the first tag is a <DEVICE> tag, the simulation operation execution unit 213 judges whether the first tag is the <DEVICE> tag for the device that the operator has designated (Step S910). When it is not the case, the process returns to Step S904, and when it is the case, the simulation operation execution unit 213 judges whether the next tag is an <OUTPUT> tag (Step S912). When the next tag is an <OUTPUT> tag, the "processing 1", which will be described later, is executed (Step S914). When the next tag is not an <OUTPUT> tag, the process proceeds to Step S916.

At Step S916, the simulation operation execution unit 213 judges whether the next tag is an <INPUT>.tag. When it is not the case, the process returns to Step S904. When it is the case, the "processing 2", which will be described later, is executed (Step S918), and the process returns to Step S904.

At Step S908, when the first tag is not a <DEVICE> tag, the simulation operation execution unit 213 analyzes the HTML tags using the HTML browser (Step S920), and expands the HTML tags to internal data (Step S922). The process returns to Step S904.

At Step S906, when judging that the first tag is at the end of the transmission document, the simulation operation execution unit 213 executes the "processing 3", which will be described later (Step S924). The process finishes.

Figure 10:
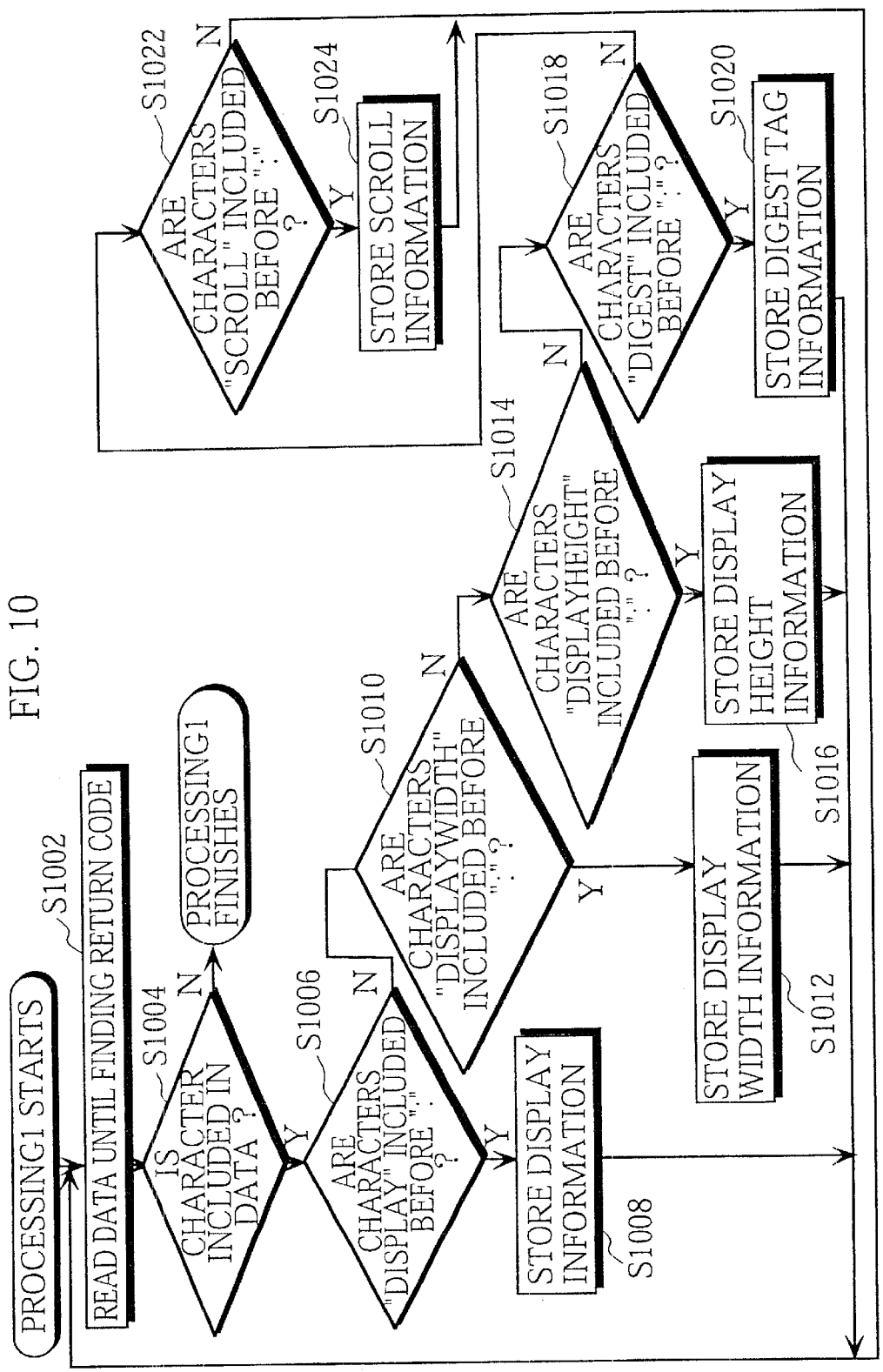
FIG. 10 is a flowchart illustrating Step S914 in FIG. 9 in detail.

The "processing 1" at Step S914 will be explained in detail with reference to the flowchart shown in FIG. 10.

In the "processing 1", simulation operation execution unit 213 obtains the image display information on a device that the operator has designated from the character string between an <OUTPUT> tag and a </OUTPUT> tag.

The simulation operation execution unit 213 reads data until finding a return code (Step S1002), and judges whether any character is included in the data (Step S1004). When no character is included in the data, the "processing 1" finishes. When any character is included, the simulation operation execution unit 213 judges whether characters "display" are included before a ":" (Step S1006). When the characters "display" are included, the simulation operation execution unit 213 stores the characters after the ":" as the "display information" (Step S1008). The process returns to Step S1002. When the characters "display" are not included, the simulation operation execution unit 213 judges whether characters "displaywidth" are included before the ":" (Step S1010). When the characters "displaywidth" are included, the simulation operation execution unit 213 stores the characters after the ":" as the "display width information" (Step S1012). The process returns to Step S1002. When the characters "displaywidth" are not included, the simulation operation execution unit 213 judges whether characters "displayheight" are included before the ":" (Step S1014). When the characters "displayheight" are included, the simulation operation execution unit 213 stores the characters after the ":" as the "display height information" (Step S1016). The process returns to Step S1002. When the characters "displayheight" are not included, the simulation operation execution unit 213 judges whether characters "digest" are included before the ":" (Step S1018). When the characters "digest" are included, the simulation operation execution unit 213 stores the characters after the ":" as the "digest tag information" (Step S1020). The process returns to Step S1002. When the characters "digest" are not included, the simulation operation execution unit 213 judges whether characters "scroll" are included before the ":" (Step S1022). When the characters "scroll" are included, the simulation operation execution unit 213 stores the characters after the ":" as the "scroll information" (Step S1024). The process returns to Step S1002. When the characters "scroll" are not included, the process returns to Step S1002.

Figure 11:
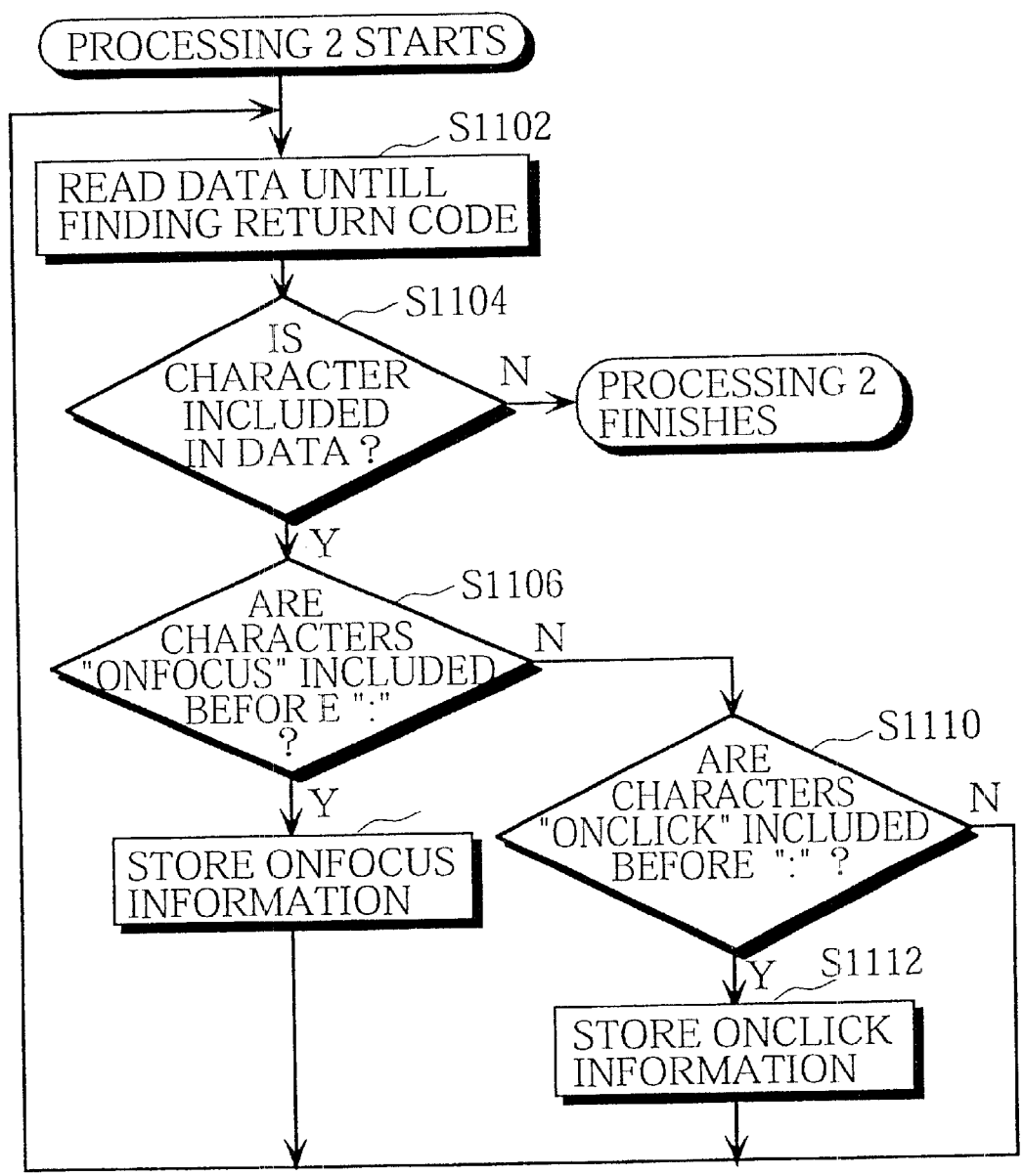
FIG. 11 is a flowchart illustrating Step S918 in FIG. 9 in detail.

The "processing 2" at Step S918 will be explained in detail with reference to the flowchart shown in FIG. 11.

In the "processing 2", simulation operation execution unit 213 obtains the information on the processing corresponding to the operation of a button on a device that the operator has designated from the character string between an <INPUT> tag and a </INPUT> tag.

The simulation operation execution unit 213 reads data until finding a return code (Step S1102), and judges whether any character is included in the data (Step S1104). When no character is included in the data, the "processing 2" finishes. When any character is included, the simulation operation execution unit 213 judges whether characters "onfocus" are included before a ":" (Step S1106). When the characters "onfocus" are included, the simulation operation execution unit 213 stores the characters after the ":" as the "onfocus information" (Step S1108). The process returns to Step S1102. When the characters "onfocus" are not included, the simulation operation execution unit 213 judges whether characters "onclick" are included before the ":" (Step S1110). When the characters "onclick" are included, the simulation operation execution unit 213 stores the characters after the as the "onclick information" (Step S1112). The process returns to Step S1102. When the characters "onclick" are not included, the process returns to Step S1102.

The "processing 3" at Step S924 will be explained in detail with reference to the flowchart shown in FIG. 12.

In the "processing 3", simulation operation execution unit 213 creates display data according to the image display information on a device that the operator has designated.

The simulation operation execution unit 213 judges whether digest tag information is included in the stored information on the display (Step S1202). When digest tag information is included, the simulation operation execution unit 213 obtains the digest tag information (Step S1204), and extracts the tag information corresponding to the obtained digest tag information from the internal data expanded at Step S922 (Step S1206). The process proceeds to Step S1210.

At Step S1202, when no digest tag information is included, the simulation operation execution unit 213 obtains all of the internal data expanded at Step S922 (Step S1208), and the process proceeds to Step S1210. At Step 1210, the simulation operation execution unit 213 obtains the display width information, the display height information, and the scroll information that are stored as the image display information, and extracts the information corresponding to one tag from the internal data (Step S1212).

Then, the simulation operation execution unit 213 judges whether tag information is included in the extracted information (Step S1214). When it is the case, the simulation operation execution unit 213 calculates the display position of the tag information (Step S1216), and judges whether the display position is within the display screen (Step S1218). When the display position is within the display screen, the process returns to Step S1212, and when the display position goes beyond the display screen, the simulation operation execution unit 213 judges whether the scroll information is "normal" (Step S1220). When the scroll information is "normal", the simulation operation execution unit 213 calculates the display position on the virtual screen (S1222), and the process returns to Step S1212. When the scroll information is not "normal", the simulation operation execution unit 213 judges whether the scroll information is "card" (Step S1224). When the scroll information is not "card", the process returns to Step S1212. When the scroll information is "card", the simulation operation execution unit 213 calculates the display position of the tag information on the switched screen (Step S1226), and the process returns to Step S1212.

At Step S1214, when judging that no tag information is included in the extracted information, the simulation operation execution unit 213 creates the frame of the display screen and creates display data in the calculated display position (Step S1228), and the process finishes.

The simulation operation execution unit 213 creates display data through the process shown in the flowcharts in FIGS. 9 to 12, and simulates the display of the document 301 by a designated device on the display 214 of the output unit 215.

Figure 13:
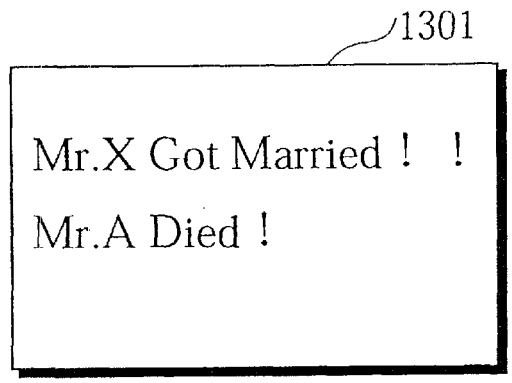
FIG. 13 shows a transmission document displayed on the display in the transmission document edition device according to the first embodiment of the present invention.

For instance, when a received document processing device 105 designated by the operator is a pager 107, the digest tag information is only the tag information represented by the tag <H1>. As a result, display data 1301 shown in FIG. 13 is displayed on the display 214. The scroll information for the display data 1301 is "card", so that the display data which is not shown on one screen is shown on another screen.

Figure 14:
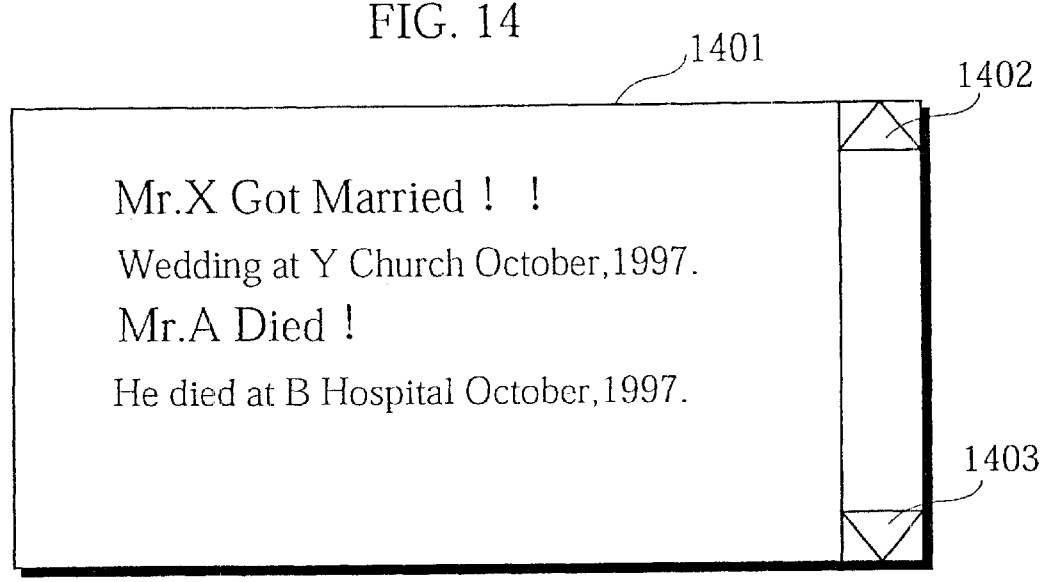
FIG. 14 shows another transmission document displayed on the display in the transmission document edition device according to the first embodiment of the present invention.

When a received document processing device 105 designated by the operator is a phone 106, the digest tag information is the tag information represented by the tags <H1> and <H2>. As a result, display data 1401 shown in FIG. 14 is displayed on the display 214. The scroll information for the display data 1401 is "normal", so that scroll bars 1402 and 1403 are attached to the display data 1401.

Figure 15:
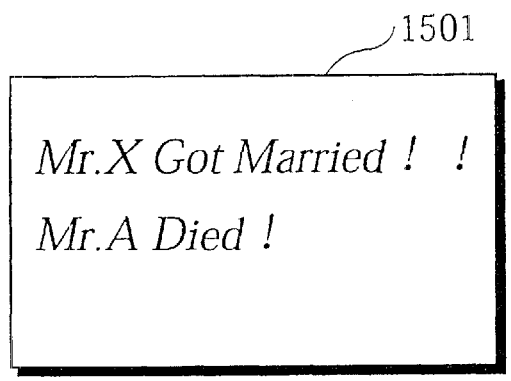
FIG. 15 shows a display of the transmission document in FIG. 13 when the transmission document is changed according to an input operation.

When the display data 1301 shown in FIG. 13 is displayed on the display 214 and when a signal that the "select button" on a pager 107 is pressed is transmitted from the input information conversion unit 212, the simulation operation execution unit 213 obtains the "onclick information" that has been stored, and changes the type of the font of the display data 1301 into italic according to the program of the script 309 described on the document body 612 in the transmission document 615. As a result, display data 1501 shown in FIG. 15 is displayed on the display 214.

The output unit 215 includes the display 214 having a CRT or a liquid crystal display and outputs the simulation of display data that is to be displayed by a designated received document processing device 105 under the control of the simulation operation execution unit 213.

When receiving a transmission instruction by the operator from the input unit 205 via the control unit 206, the transmission unit 216 transmits the transmission document 615 stored in the transmission document storage unit 210 to the information providing server device 102.

Figure 16:
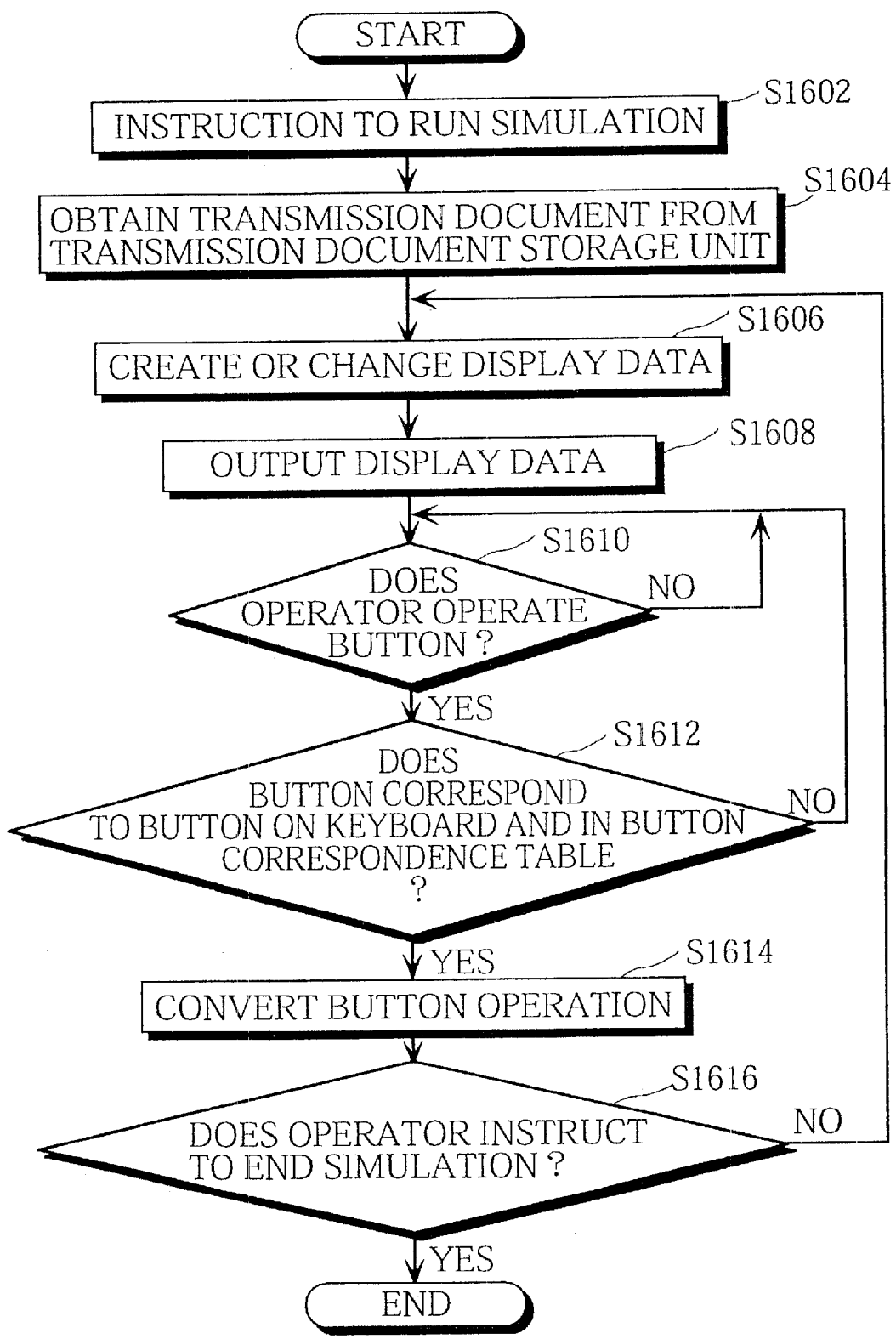
FIG. 16 is a flowchart illustrating the processing by the simulation operation execution unit in the transmission document edition device according to the first embodiment of the present invention.

The simulation processing by the transmission document edition device 103 according to the present embodiment will be explained with reference to the flowchart in FIG. 16.

The simulation operation execution unit 213 receives the instruction by the operator to run a simulation from the input unit 205 via the control unit 206 (Step S1602).

The simulation operation execution unit 213 reads the transmission document 615 from the transmission document storage unit 210 (Step S1604). The simulation operation execution unit 213 creates display data or changes the created display data according to the device type for which the simulation is run (Step S1606), and outputs the created or changed display data on the display 214 (Step S1608).

The input information conversion unit 212 waits for a signal of a button operation by the user to be transmitted via the control unit 206 (Step S1610). When receiving a signal, the input information conversion unit 212 judges whether the operated button is a button that is on the keyboard 203 and is included in the button correspondence table 801 (Step S1612). When it is not the case, the process returns to Step S1610. When it is the case, the input information conversion unit 212 converts the received signal into the signal of the operation of the corresponding button on the designated device, and informs the simulation operation execution unit 213 of the converted signal (Step S1614). The input information conversion unit 212 judges whether the operator instructs to end the simulation, i.e., a signal of the operation of the F6 button is transmitted (Step S1616). When it is the case, the process finishes. When it is not the case, the process returns to Step S1606.

According to the present embodiment, a transmission document may be created from an HTML document to be transmitted and a plurality of pieces of device input/output information corresponding to the plurality of types of mobile communication terminal. Such a transmission document may be processed by each type of mobile communication terminal. As a result, the load is light compared with that in the transmission document creation for each type of mobile communication terminal. In addition, according to the present embodiment, the processing of the transmission document by each type of mobile communication terminal may be simulated and checked in advance. As a result, transmission documents may be created more efficiently.

In the present embodiment, a piece of different device input/output information is described for each type of mobile communication terminal such as the "pager" or the "phone". It is possible to describe a piece of different device input/output information for each specification of mobile communication terminal. In this case, it is possible to prepare one piece of device input/output information for one type of mobile communication terminal to be used in creating a piece of device input/output information for each specification of mobile communication terminal.

Second Embodiment

Figure 17:
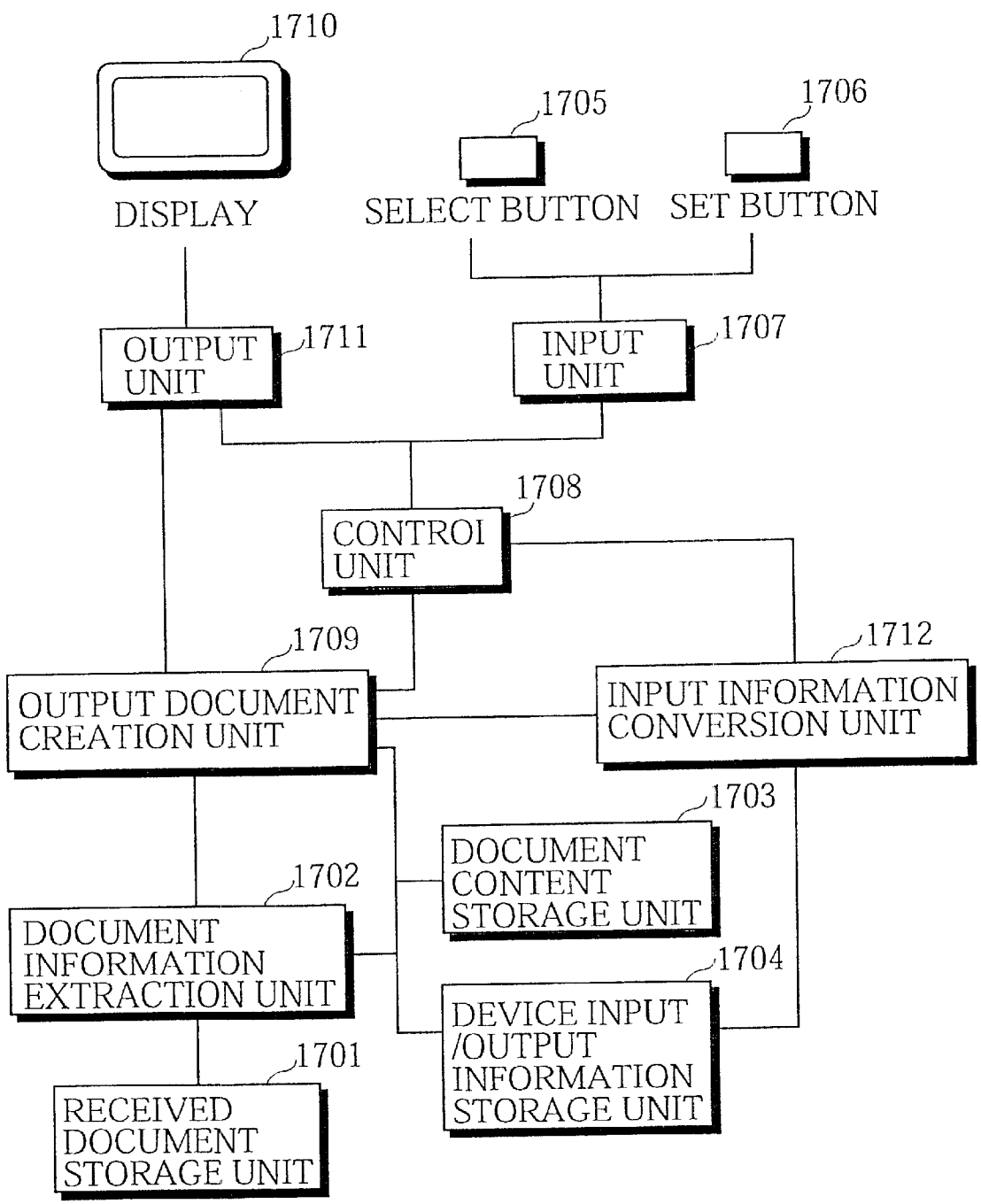
FIG. 17 shows a construction of a received document processing device according to the second embodiment of the present invention.

FIG. 17 shows a construction of a received document processing device according to the second embodiment of the present invention. The received document processing device includes a received document storage unit 1701, a document information extraction unit 1702, a document content storage unit 1703, a device input/output information storage unit 1704, an input unit 1707, a control unit 1708, an output document creation unit 1709, an output unit 1711, and an input information conversion unit 1712. The input unit 1707 further includes a "select button" 1705 and a "set button" 1706. The output unit 1711 further includes a display 1710.

The received document processing device is explained using a pager 107. Not being the subject of the present invention, however, the construction of the pager 107 will not be explained in this specification.

The received document storage unit 1701 is composed of a RAM or another storage device. When a reception unit (not illustrated) receives a transmission document edited by the transmission document edition device 103 via the relay server device 104, the received document storage unit 1701 stores the received document. The received document is the transmission document 615 in FIG. 6 that as been explained in the first embodiment. Hereinafter, he transmission document 615 is used as a "received document 615" in the second embodiment.

When the received document storage unit 1701 stores the received document 615, the document information extraction unit 1702 writes the document body 612 of the received document 615 in the document content storage unit 1703, extracts the SS 603 described for the pagers 107, and writes the extracted SS 603 in the device input/output information storage unit 1704.

The document content storage unit 1703 is composed of a RAM or another storage device, and stores the document body 612 of the received document 615 stored in the received document storage unit 1701.

The device input/output information storage unit 1704 stores the SS 603 of the received document 615 in which the device input/output information for the pagers 107 is described.

When the select button 1705 or the set button is pressed, the input unit 1707 informs the input information conversion unit 1712 of an operation signal via the control unit 1708.

The control unit 1708 controls the input unit 1707, the output unit 1711, and the like.

Installed with an HTML browser, the output document creation unit 1709 reads and analyzes the document body 612 stored in the document content storage unit 1703 and the SS 603 stored in the device input/output information storage unit 1704. The output document creation unit 1709 creates display data from the document body 612 and the SS 603, and has the display 1710 of the output unit 1711 display the display data.

The processing of display data creation is almost the same as the processing by the simulation operation execution unit 213 in the first embodiment. The difference is described below. The output document creation unit 1709 reads the document body 612 and the SS 603 of the received document 615, while the simulation operation execution unit 213 reads the transmission document 615 as a whole.

Figure 9:
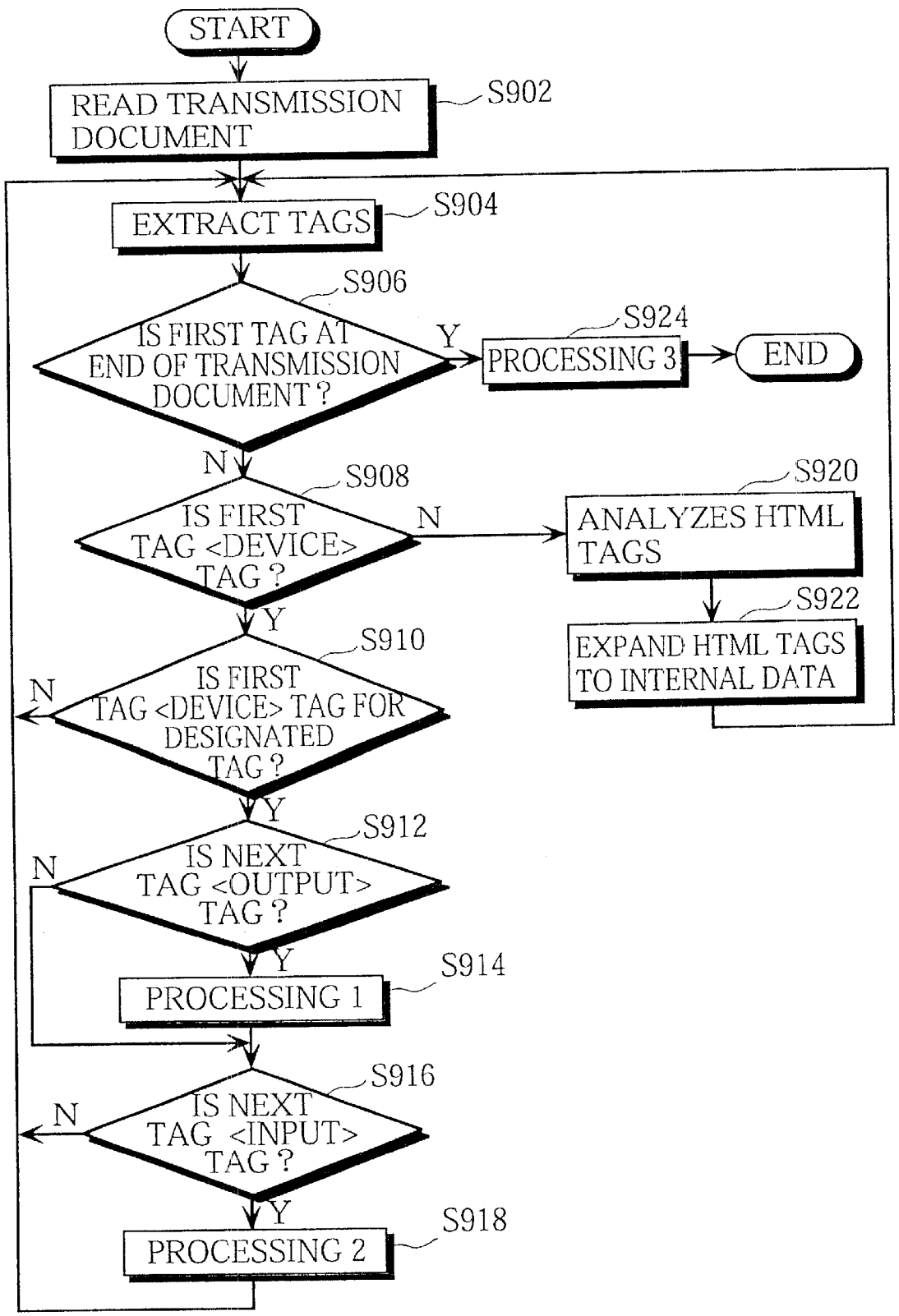
FIG. 9 is a flowchart illustrating the creation of display data by the simulation operation execution unit in the transmission document edition device according to the first embodiment of the present invention.

As a result, Step 910 in the flowchart in FIG. 9, at which the simulation operation execution unit 213 judges whether the information is for the designated device, is unnecessary for the display data creation by the output document creation unit 1709. This is because the output document creation unit 1709 reads the input/output information for the pagers 107 stored in the device input/output information storage unit 1704.

Figure 12:
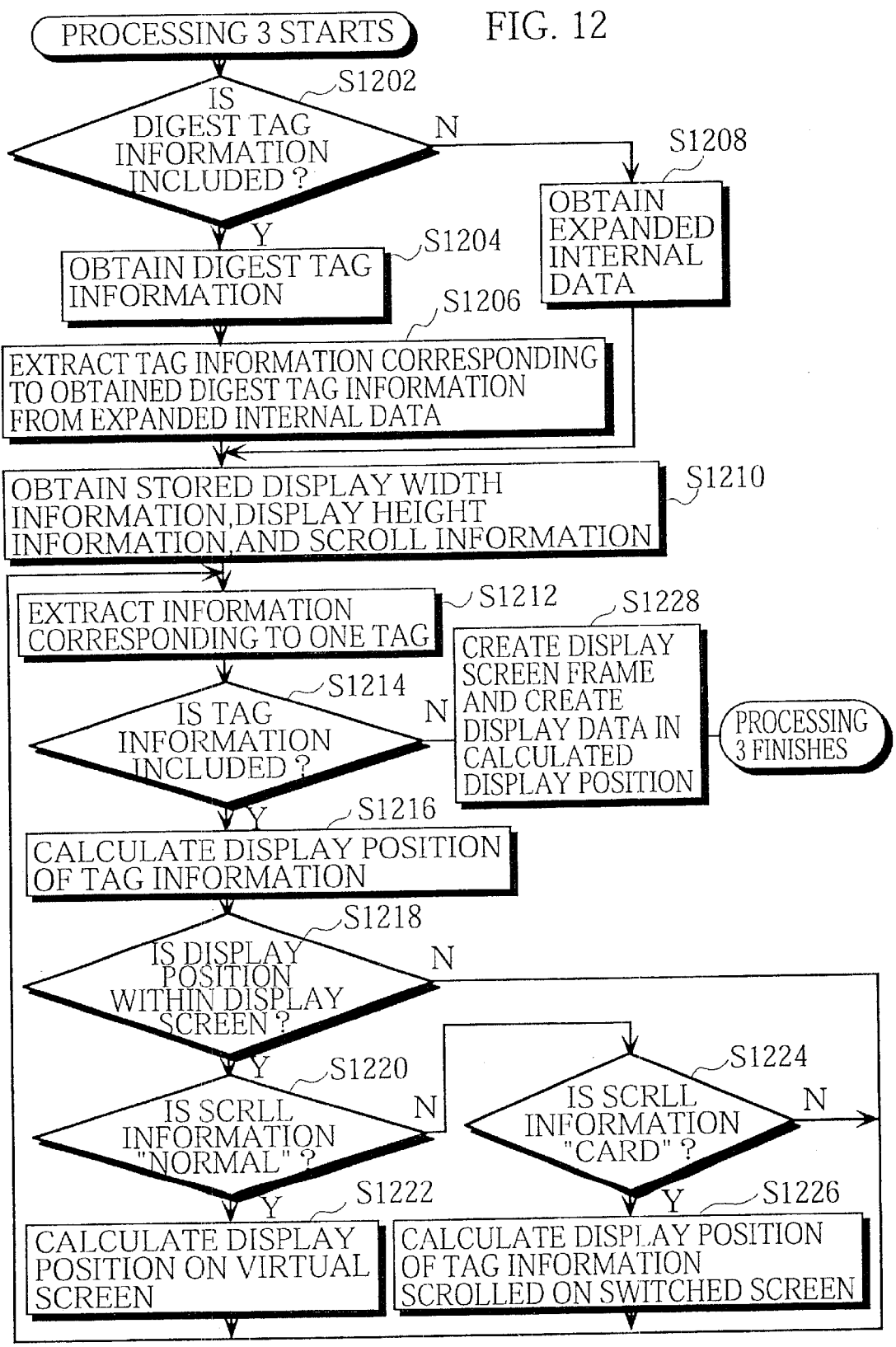
FIG. 12 is a flowchart illustrating Step S924 in FIG. 9 in detail.

In addition, it is unnecessary for the output document creation unit 1709 to create a frame of the display screen as created at Step 1228 in the flowchart shown in FIG. 12. This is because the size of such a frame is the same as the size of the display 1710.

When informed of a signal of onclick or onfocus from the input information conversion unit 1712, the output document creation unit 1709 changes the display data displayed on the display 1710 according to the corresponding processing program described in the document body 612, and has the changed display data be displayed.

The output unit 1711 displays the display data created or changed by the output document creation unit 1709 on the display 1710 that includes a liquid crystal display or the like.

When informed of a signal that the user presses the select button 1705 or the set button 1706 of the input unit 1707 via the control unit 1708, the input information conversion unit 1712 judges whether the informed signal corresponds to the onfocus information or the onclick information stored in the device input/output information storage unit 1704. When it is the case, the input information conversion unit 1712 converts the signal into the corresponding signal, i.e., a signal of onclick or onfocus, and informs the output document creation unit 1709 of the converted signal.

Figure 18:
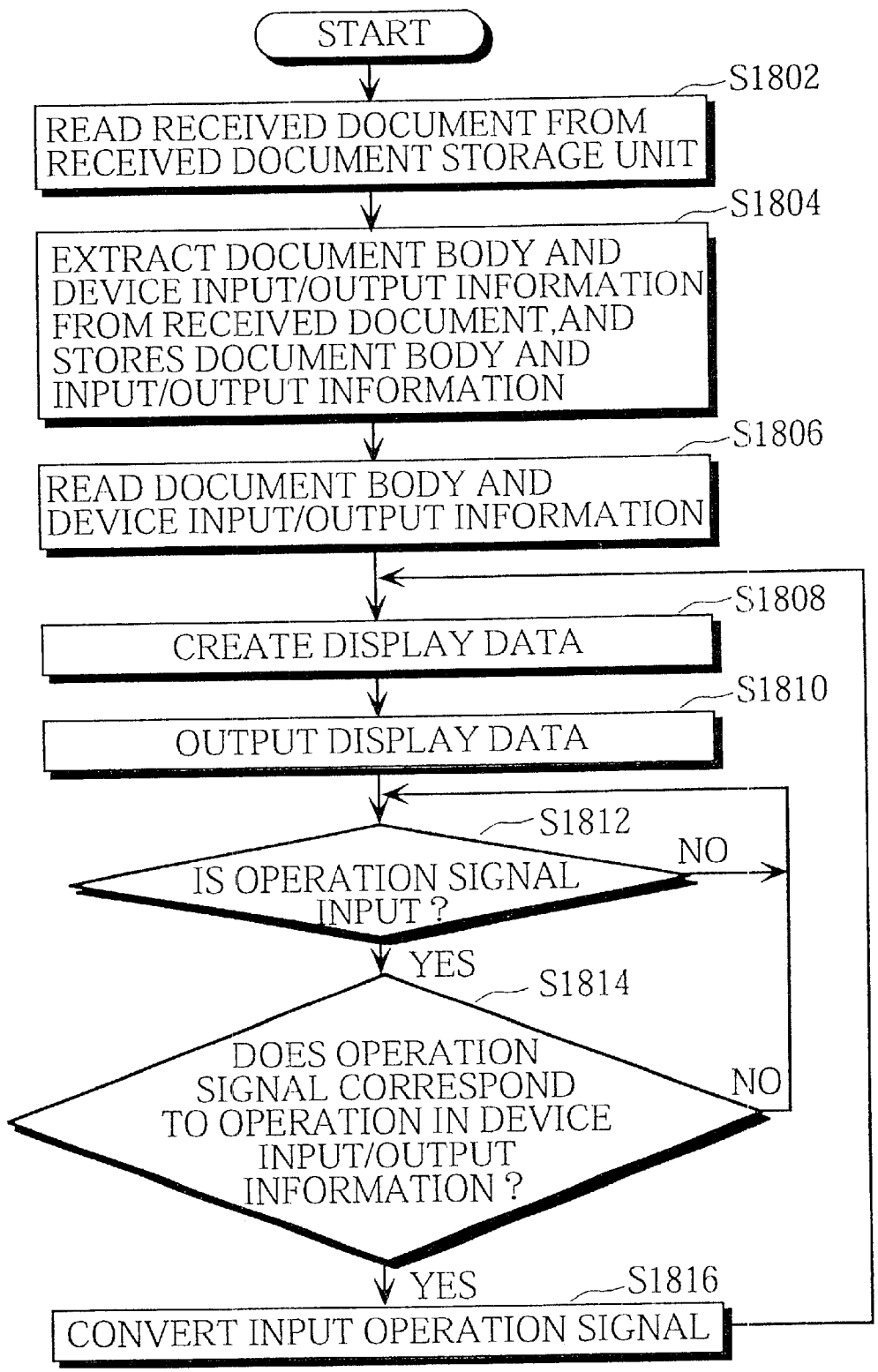
FIG. 18 is a flowchart illustrating the processing by the received document processing device according to the second embodiment of the present invention.

The overall processing by the received document processing device will be explained with reference to the flowchart shown in FIG. 18.

When the received document storage unit 1701 stores the received document 615, the document information extraction unit 1702 reads the received document 615 from the received document storage unit 1701 (Step S1802). The document information extraction unit 1702 extracts the document body 612 and the SS 603, which is the input/output information for the pagers 107, from the read received document 615, and writes the document body 612 and the SS 603 in the document content storage unit 1703 and the device input/output information storage unit 1704, respectively (Step S1804).

When informed that the document information extraction unit 1702 finishes writing the document body 612 and the SS 603, the output document creation unit 1709 reads the document body 612 and the SS 603 (Step S1806). The output document creation unit 1709 analyzes the read document body 612 and SS 603, and creates display data or changes the display data according to a processing program (Step S1808).

The output unit 1711 displays the created or changed display data on the display 1710 (Step S1810).

The input information conversion unit 1712 waits for an operation signal from the input unit 1707 (Step S1812). When informed of an operation signal, the input information conversion unit 1712 judges whether the operation signal corresponds to an operation described in the SS 603 stored in the device input/output information storage unit 1704 (Step S1814). When it is not the case, the process returns to Step S1812. When it is the case, the input information conversion unit 1712 converts the operation signal into a signal of the corresponding operation, and informs the output document creation unit 1709 of the converted signal (Step S1816). The process returns to Step S1808.

According to the present embodiment, the style sheet for a mobile communication terminal that has received a transmission document is extracted from a plurality of style sheets, in each of which the input/output information for one type of mobile communication terminal such as pagers is described, attached to the received transmission document. As a result, it is possible to process the received document according to the type of the mobile communication terminal that receives the received document.

While the received document processing device that has been explained in the present embodiment is installed in a pager, such a received document processing device may be installed in a mobile phone or other types of mobile communication terminals such as a PDA (Personal Digital Assistant).

Third Embodiment

Figure 19:
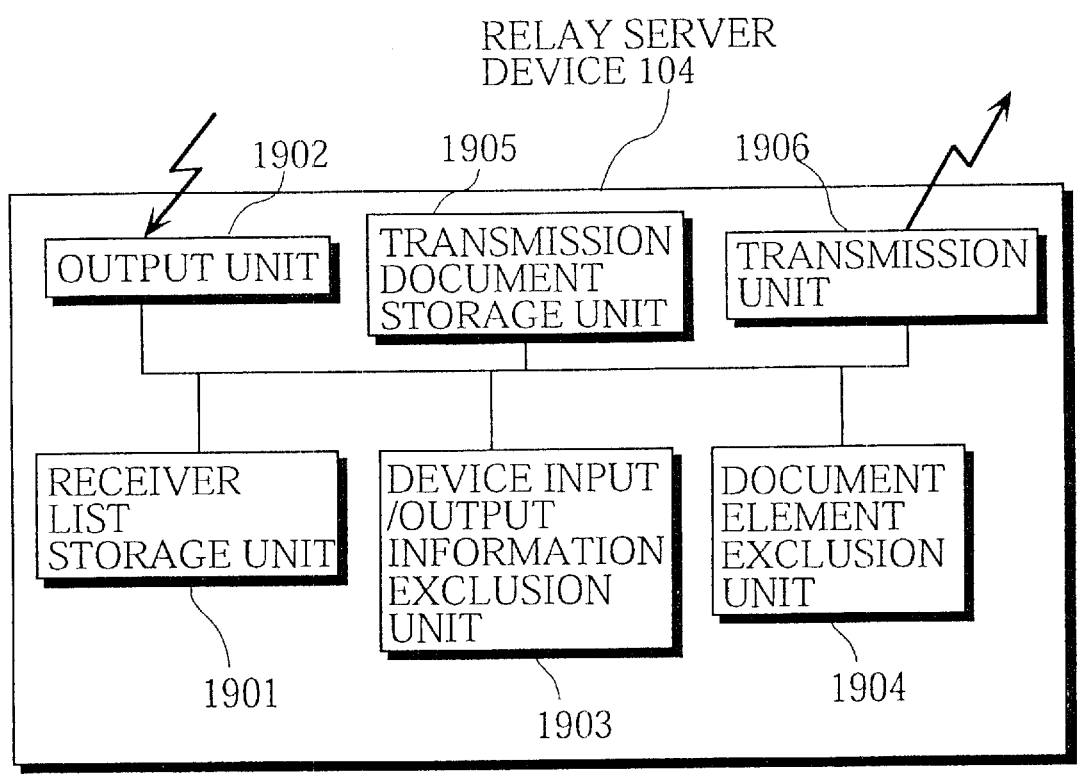
FIG. 19 shows a construction of a relay server device in a communication document processing system according to the third embodiment of the present invention.

FIG. 19 shows a construction of a relay server device in a communication document processing system according to the third embodiment of the present invention.

The relay server device in the communication document processing system includes a receiver list storage unit 1901, a reception unit 1902, a device input/output information exclusion unit 1903, a document element exclusion unit 1904, a transmission document storage unit 1905, and a transmission unit 1906.

The receiver list storage unit 1901 stores a receiver list 2000 shown in FIG. 20. The receiver list storage unit 1901 stores sets of a receiver identifier 2002 and a device type 2003 in the receiver list 2000. For instance, the device type of the received document processing device distinguished by the identifier "Aa" is phone, and that distinguished by the identifier "Ca" is pager.

The reception unit 1902 receives and temporarily stores the transmission document 615 edited by the transmission document edition device 103 from the information providing server device 102 on the Internet 101.

The device input/output information exclusion unit 1903 excludes unnecessary device input/output information in the transmission document that the reception unit 1902 receives for each device type 2003 in the receiver list 2001.

For instance, the device input/output information on pager is unnecessary for the phones distinguished by the receiver identifiers "Aa", "Ab", and "Ac", so that the SS 603 for pagers is excluded from the transmission document 615 for the phones.

For the pagers distinguished by the receiver identifiers "Ca", "Cb", and "Cc", the device input/output information on phone is unnecessary, so that the SS 604 is excluded from the transmission document 615 for the pagers.

For the personal computers distinguished by the receiver identifiers "Ba", "Bb", and "Bc", no device input/output information is necessary, so that the SSs 603 and 604 are excluded from the transmission document 615 for the personal computers.

The device input/output information exclusion unit 1903 writes transmission documents 615 each of which the receiver identifiers are added to and the unnecessary device input/output information is excluded from in the transmission document storage unit 1905.

The document element exclusion unit 1904 excludes the document elements unnecessary for the received document processing device in a receiver from the document body 612 in a transmission document 615 that the device input/output information exclusion unit 1903 has written for the receiver.

More specifically, the document element exclusion unit 1904 reads the digest tag information included in the image display information in the transmission document 615, and excludes the tag information except for the tag information corresponding to the read digest tag information from the document body in the transmission. document 615.

Figure 21:
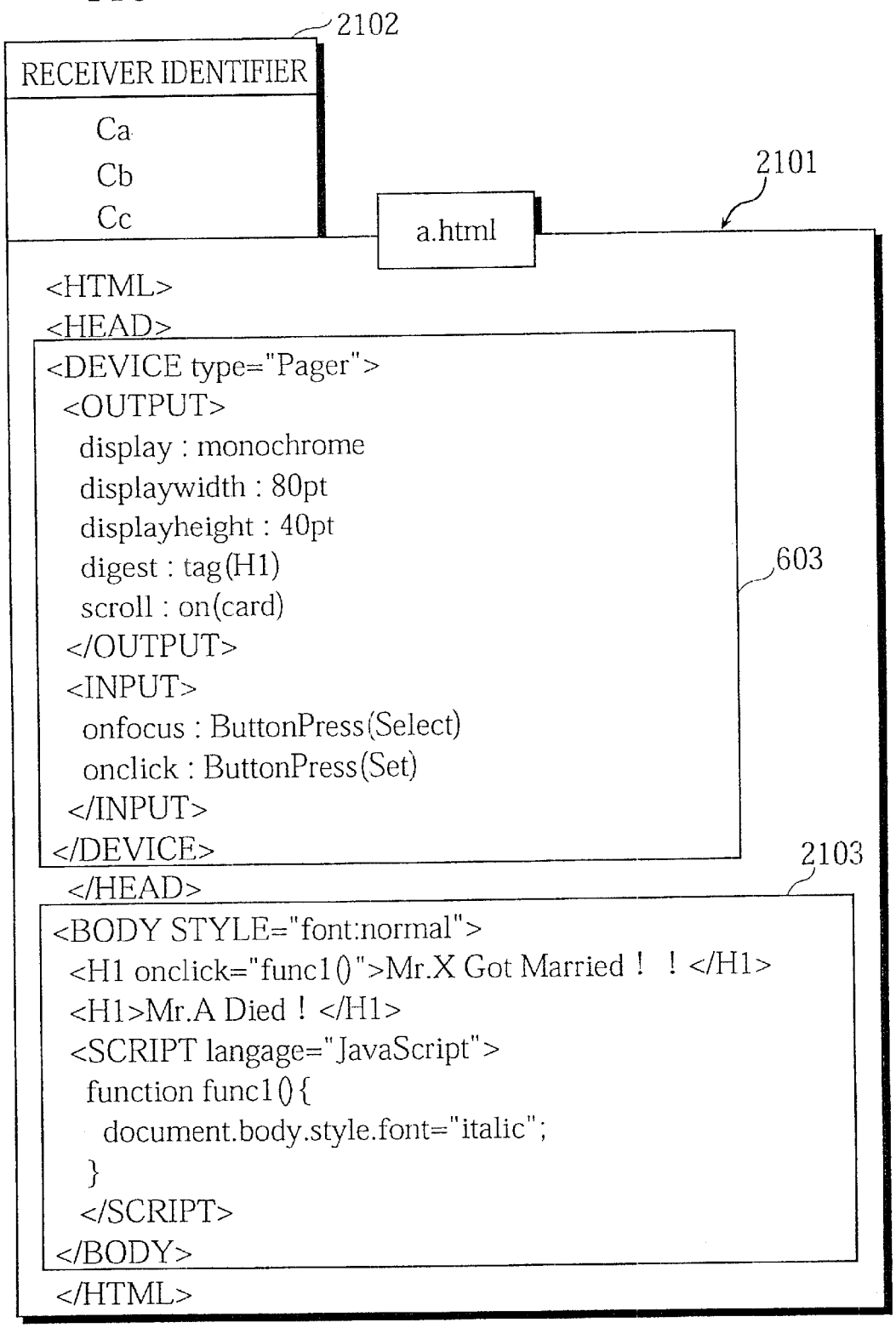
FIG. 21 is a transmission document for pagers stored in the transmission document storage unit in the relay server device in the communication document processing system according to the third embodiment of the present invention.

For instance, the document element exclusion unit 1904 creates a transmission document 2101 shown in FIG. 21 for the pagers 107 that are distinguished by the receiver identifiers "Ca", "Cb", and "Cc".

FIG. 21 shows a transmission document 2101 that is to be transmitted to the received document processing devices 105 that are the pagers 107 distinguished by the receiver identifiers "Ca", "Cb", and "Cc". The transmission document 2101 includes only the SS 603 that is the device input/output information for the pagers 107 and a document body 2103 in which the tag information corresponding to the digest tag information in the SS 603, "H1" is a document element.

Figure 22:
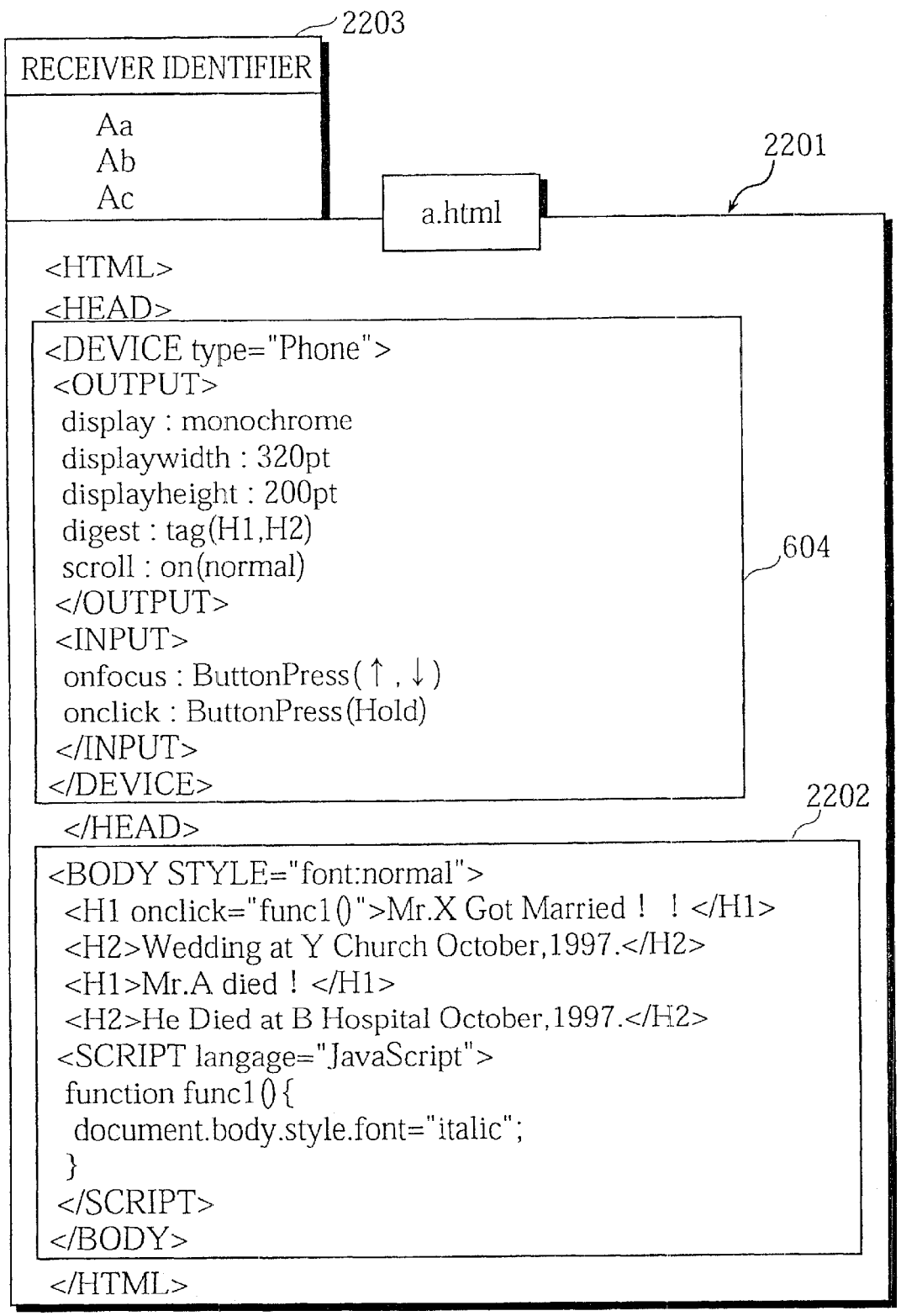
FIG. 22 is a transmission document for mobile phones stored in the transmission document storage unit in the relay server device in the communication document processing system according to the third embodiment of the present invention.

FIG. 22 shows a transmission document 2201 that is to be transmitted to the phones 106 that are distinguished by the receiver identifiers "Aa", "Ab", and "Ac". The transmission document 2201 includes the SS 604 for the phones 106 and a document body 2202 in which the tag information corresponding to the digest tag information in the SS 604, "Hi" and "H2" are document elements. To the transmission document 2201, receiver identifiers 2203 are attached.

For the personal computers 108, the document body 612 shown in FIG. 6 is to be transmitted. To the transmission document, receiver identifiers "Ba", "Bb", and "Bc" are attached.

The transmission document storage unit 1905 stores the transmission documents 2101, 2102, and the like that the device input/output information exclusion unit 1903 and the document element exclusion unit 1904 have written.

The transmission unit 1906 transmits the transmission documents 2101, 2102, and the like to the corresponding received document processing devices distinguished by the received identifiers attached to the transmission documents.

While the construction in which new transmission documents are created is installed in the relay server device 104 in the present embodiment, the construction may be installed in the information providing server device 102.

While the transmission document processing system includes the information providing server device 102 and the relay server device 104 in the present embodiment, the transmission document processing system may include a server device that realizes the functions of the information providing server device 102 and the relay server device 104.

According to the present embodiment, each received document processing device receives only the necessary device input/output information and the necessary document elements. As a result, transmission documents are transmitted efficiently, and the memory resource that stores a received document in each received document processing device is efficiently used.

While the HTML is used as a markup language in the above-described embodiments, such a markup language is not necessarily limited to the HTML. For instance, the XML (Extensible Markup Language) may be used in describing transmission documents.

Transmitted via public networks in the above-described embodiments, the transmission documents may be transmitted from broadcasting stations as broadcast waves.

In the above-described embodiments, FIG. 2 shows a construction of a transmission document edition device, FIG. 17 shows a construction of a received document processing device, and FIG. 19 shows a construction of the relay server device in the transmission document processing system. The present invention may be realized by recording a program that achieves the functions of each element in these devices on a computer-readable storage medium.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A transmission document editing device that edits a transmission document to be transmitted to receiver devices of a plurality of specifications from a general purpose document described in a markup language, comprising:

document storage means for storing the general purpose document described in the markup language;

device specification information storage means for storing a plurality of pieces of device specification information, each piece of which includes input information that defines a correspondence between a user operation directed to the receiver device and an operation to be done to the general purpose document; and transmission document creation means for reading the general purpose document stored in the document storage means and the plurality of pieces of device specification information stored in the device specification information storage means and for creating the transmission document in which the general purpose document and the plurality of pieces of device specification information are related to each other.

2. The transmission document editing device according to claim 1, wherein the input information includes each operation of a receiver device of a specification for pushing a button and/or key and a processing of the general purpose document accompanying an operation for each operation, and the transmission document creation means reads input information for each of the plurality of specifications of receiver device from the device specification information storage means, and has the read input information be included in the transmission document in a manner in which input information for a specification of receiver device is distinguishable.

3. The transmission document editing device of claim 2, wherein the device specification information further includes output information for defining a part of the plurality of text elements that composes the general purpose document and that is to be displayed as an abstract, and the transmission document creating means reads input information and output information for each of the plurality of specifications of receiver device from the device specification information storage means, and has the input information and the output information be included in the transmission document in a manner in which the input information and the output information for a specification of receiver device is distinguishable.

4. The transmission document editing device according to claim 3, further comprising transmission means for transmitting the transmission document that the transmission document creation means has created to the receiver devices of the plurality of specifications.

5. The transmission document editing device of claim 3, wherein the transmission document creating means acquires a specification of a receiver device to which a transmission document is directed, and creates the transmission document by selecting device specification information that corresponds to the acquired specification of the receiver device.

6. The transmission document editing device according to claim 1, further comprising:

transmission document storage means for storing the transmission document that the transmission document creation means has created;

acceptance means for accepting a designation of a specification of receiver device for which a simulation is run from an operator; and simulation execution means for reading a piece of device specification information for the accepted specification of receiver device and the general purpose document from the transmission document stored in the transmission document storage means, for creating a simulation document from the read general purpose document according to the read piece of device specification information, and for displaying the created simulation document.

7. The transmission document editing device according to claim 6, further comprising:

simulation information storage means for storing simulation information in which first operation keys on the receiver devices of the plurality of specifications correspond to second operation keys on the transmission document editing device, wherein the general purpose document includes a user operation and a content of a processing accompanying the user operation, the piece of device specification information includes information that describes an operation of a first operation key corresponding to the user operation, the acceptance means includes an operation key acceptance unit for accepting an operation of a second operation key from the operator, the simulation execution means includes:

an operation key conversion unit for converting the accepted second operation key operation into a corresponding operation of a first operation key; and a simulation document changing unit for changing the displayed simulation document according to a content of a processing that corresponds to a user operation corresponding to the first operation key operation and for displaying the changed simulation document.

8. The transmission document editing device according to claim 7, wherein the general purpose document includes a plurality of text elements, the read piece of device specification information further includes output information for defining a part of the plurality of text elements to be displayed as an abstract, and the simulation execution means includes a simulation document creation unit for selecting the part of the plurality of text elements to be displayed-from the general purpose document and for creating the simulation document from the selected text elements.

9. The transmission document editing device according to claim 7, wherein the processing is written in a program that is described in a virtual machine language, and the simulation document changing unit changes the displayed simulation document according to the program.

10. A received document processing device that receives a received document in which a general purpose document that is described in a markup language and a plurality of pieces of device specification information, each piece of which being input information that defines a correspondence between a user operation directed to the receiver device and an operation to be done to the general purpose document, the received document processing device, comprising:

received document storage means for storing the received document that the received document processing device has received;

received document reading means for reading the received document that the received document storage means stores;

first identification means for identifying the plurality of pieces of device specification information and the general purpose document in the read received document;

second identification means for identifying a piece of device specification information for the received document processing device in the plurality of pieces of device specification information;

a display screen; and display control means for creating a display document based on the general purpose document that the first identification means has identified and for displaying the created display document on the display screen, and for modifying the displayed document, when receiving a user operation, by performing a corresponding processing to the user operation on referring to the piece of device specification information that the second identification means has identified.

11. The received document processing device according to claim 10, wherein a processing is written in a program that is described in a virtual machine language, and the display control means changes the display document according to the program.

12. The received document processing device of claim 10, wherein the input information includes each operation of a receiver device of a specification for pushing a button and/or a key and a processing of the general purpose document accompanying an operation for each operation, and the display control means modifies the displayed document, on referring to the input information identified by the second identification means and to the accompanying processing.

13. The received document processing apparatus of claim 12, wherein the device specification information further includes output information for defining a part of the plurality of text elements that composes the general purpose document and that is to be displayed as an abstract, the second identification means identifies input information and output information that are device specification information of the received document processing device, and the display control means further comprises:
 a text element selection unit for selecting the part of the plurality of text elements to be displayed, according to the output information.

14. The received document processing device according to claim 13 is one of a pager and a mobile phone.

* * * * *

UNITED STATES PATENT AND TRADEMARK OFFICE
CERTIFICATE OF CORRECTION

PATENT NO.    : 6,477,549 B1
DATED         : November 5, 2002
INVENTOR(S)   : Hishida et al.

It is certified that error appears in the above-identified patent and that said Letters Patent is hereby corrected as shown below:

<u>Column 22,</u>
Line 15, delete the hyphen between "displayed" and "from".

Signed and Sealed this

First Day of July, 2003

JAMES E. ROGAN
*Director of the United States Patent and Trademark Office*